US012793317B2

(12) United States Patent
Jiang et al.

(10) Patent No.: US 12,793,317 B2
(45) Date of Patent: Nov. 10, 2026

(54) METHOD AND ELECTRONIC DEVICE WITH RENDERED IMAGE GENERATION

(71) Applicant: Samsung Electronics Co., Ltd., Suwon-si (KR)

(72) Inventors: Yan Jiang, Xi'an (CN); Yue Ma, Xi'an (CN); Fan Zhang, Xi'an (CN); Feng Zhu, Xi'an (CN); Xiao Tang, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 18/953,438

(22) Filed: Nov. 20, 2024

(65) Prior Publication Data

US 2025/0191269 A1 Jun. 12, 2025

(30) Foreign Application Priority Data

Dec. 8, 2023 (CN) ......................... 202311684797.7
Aug. 16, 2024 (KR) ........................ 10-2024-0109720

(51) Int. Cl.
*G06T 15/00* (2011.01)

(52) U.S. Cl.
CPC .......... *G06T 15/00* (2013.01); *G06T 2200/04* (2013.01)

(58) Field of Classification Search
None
See application file for complete search history.

(56) References Cited

U.S. PATENT DOCUMENTS 11,574,432 B2 * 2/2023 Morisawa ............... G06T 15/00
12,141,910 B2 * 11/2024 Bigos ........................ G06T 1/20
(Continued)

FOREIGN PATENT DOCUMENTS

CN 114119849 A 3/2022
CN 114549731 A 5/2022

OTHER PUBLICATIONS

Barron et al. "Mip-NeRF: A Multiscale Representation for Anti-Aliasing Neural Radiance Fields" *Proceedings of the IEEE/CVF international conference on computer vision.* 2021 (pp. 5855-5864).
(Continued)

*Primary Examiner* — Saptarshi Mazumder
(74) *Attorney, Agent, or Firm* — NSIP Law

(57) ABSTRACT

A processor-implemented method includes generating a first rendered image having a first resolution by inputting target position information for a target viewpoint into a first model for a target object comprised in a three-dimensional (3D) scene, determining one or more reference images for the first rendered image from among a plurality of first images, wherein the plurality of first images is generated based on a plurality of original images in which the target object is captured from a plurality of different viewpoints, each of the plurality of original images has a second resolution, and each of the plurality of first images has the first resolution lower than the second resolution, and generating a second rendered image having the second resolution by inputting the first rendered image, the reference image, the target position information, and reference position information for the reference image into a second model.

20 Claims, 12 Drawing Sheets

(56) References Cited

U.S. PATENT DOCUMENTS

| | | | | |
|---|---|---|---|---|
| 2011/0116112 | A1* | 5/2011 | Muramatsu | G06T 3/4053 358/1.9 |
| 2017/0132769 | A1* | 5/2017 | Barron | G06F 18/22 |
| 2022/0270210 | A1* | 8/2022 | Lee | G06T 15/205 |
| 2024/0062531 | A1* | 2/2024 | Li | G06F 18/253 |
| 2025/0022124 | A1* | 1/2025 | Morard | G06T 15/00 |

OTHER PUBLICATIONS

Xiangli et al. "CityNeRF: Building NeRF at City Scale" arXiv preprint arXiv:2112.05504 Dec. 17, 2021 (pp. 1-10).

Wang et al. "NeRF-SR: High Quality Neural Radiance Fields using Supersampling" *Proceedings of the 30th ACM International Conference on Multimedia*. Jul. 21, 2022 (pp. 1-10).

Muller et al. "Instant Neural Graphics Primitives with a Multiresolution Hash Encoding" *ACM Trans. Graph.*, vol. 41, No. 4, Article 102 Jul. 2022 (pp. 1-15).

Chen et al. "MobileNeRF: Exploiting the Polygon Rasterization Pipeline for Efficient Neural Field Rendering on Mobile Architectures" *Proceedings of the IEEE/CVF Conference on Computer Vision and Pattern Recognition*. 2023 (pp. 16569-16578).

* cited by examiner

METHOD AND ELECTRONIC DEVICE WITH RENDERED IMAGE GENERATION

CROSS-REFERENCE TO RELATED APPLICATIONS

This application claims the benefit under 35 USC § 119(a) of Chinese Patent Application No. 202311684797.7 filed on Dec. 8, 2023, in the China National Intellectual Property Administration, and Korean Patent Application No. 10-2024-0109720 filed on Aug. 16, 2024, in the Korean Intellectual Property Office, the entire disclosures of which are incorporated by reference herein for all purposes.

BACKGROUND

1. Field

The following description relates to a method and electronic device with rendered image generation.

2. Description of Related Art

For rendering three-dimensional (3D) scenes for virtual reality (VR) and/or augmented reality (AR) technology, a 3D modeling technique may implement a 3D model corresponding to the 3D shape of a target object in software as a method of generating a rendered image for a 3D scene. The 3D modeling technique may be time-consuming and labor-intensive and require very high costs to generate high-quality 3D scenes. However, a neural rendering technique may learn a scene including a target object using a plurality of images obtained by capturing the target object from different viewpoints and generate an image of the scene from a new viewpoint. However, while the neural rendering technique may significantly reduce modeling costs and improve the realism of rendering results compared to the 3D modeling technique, the neural rendering technique may still generate images of insufficient quality and 3D scenes of insufficient accuracy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a processor-implemented method includes generating a first rendered image having a first resolution by inputting target position information for a target viewpoint into a first model for a target object comprised in a three-dimensional (3D) scene, determining one or more reference images for the first rendered image from among a plurality of first images, wherein the plurality of first images is generated based on a plurality of original images in which the target object is captured from a plurality of different viewpoints, each of the plurality of original images has a second resolution, and each of the plurality of first images has the first resolution lower than the second resolution, and generating a second rendered image having the second resolution by inputting the first rendered image, the reference image, the target position information, and reference position information for the reference image into a second model.

The method may include obtaining the first model for the target object by training an initial rendering model, based on the plurality of first images.

The determining of the one or more reference images for the first rendered image from among the plurality of first images may include determining a distance between each of the plurality of first images and the first rendered image, based on the target position information and position information corresponding to each of the plurality of first images, and determining the one or more reference images based on the distance between each of the plurality of first images and the first rendered image.

The determining of the one or more reference images based on the distance between each of the plurality of first images and the first rendered image may include determining, as the reference image, an image having a distance from the first rendered image less than or equal to a preset reference value from among the plurality of first images.

The determining of the one or more reference images for the first rendered image from among the plurality of first images may include determining, as the one or more reference images, an image randomly selected from among the plurality of first images.

The second model may include an image feature extraction network, a position information encoding network, and a super-resolution network, and the generating of the second rendered image by inputting the first rendered image, the reference image, the target position information, and the reference position information for the reference image into the second model may include generating a first image feature for the first rendered image by inputting the first rendered image into the image feature extraction network, generating a reference image feature for the reference image by inputting the reference image into the image feature extraction network, generating a target position feature by inputting the target position information into the position information encoding network, generating a reference position feature by inputting the reference position information into the position information encoding network, and generating the second rendered image by inputting the first image feature, the reference image feature, the target position feature, and the reference position feature into the super-resolution network.

The generating of the target position feature by inputting the target position information into the position information encoding network may include determining target 3D position coordinates based on the target position information, and determining the target position feature by encoding the target 3D position coordinates.

The generating of the second rendered image by inputting the first image feature, the reference image feature, the target position feature, and the reference position feature into the super-resolution network may include determining a first fusion feature, based on the first image feature and the target position feature, determining a reference fusion feature, based on the reference image feature and the reference position feature, and generating the second rendered image, based on the first fusion feature and the reference fusion feature.

The second model may include a plurality of sequentially concatenated residual blocks, and an input of each of the plurality of sequentially concatenated residual blocks may be generated based on one or more of outputs of previous residual blocks or an input of the second model.

The second model sequentially may include a plurality of cascading blocks, wherein each of the plurality of cascading blocks may include a plurality of residual blocks, and an input of each of the plurality of cascading blocks may be generated based on one or more of outputs of previous cascading blocks or the input of the second model.

The plurality of first images may be generated by down-sampling each of the plurality of original images having the second resolution to have the first resolution.

The second model may be obtained through operations of training the second model including generating a plurality of first original images having a third resolution by capturing a first scene from a plurality of different viewpoints, generating a first image set having a fourth resolution lower than the third resolution, based on at least some of the plurality of first original images, generating a second image set having the fourth resolution comprising images of the plurality of first original images different from images of the first image set, obtaining a first rendering model corresponding to the first scene by training an initial rendering model, based on the first image set, generating a second estimated image having the fourth resolution by inputting second position information of a second image of the second image set into the first rendering model, determining one or more second reference images for the second estimated image from among images of the first image set, generating a second test image having the third resolution by inputting the second estimated image, the second reference image, the second position information, second reference position information corresponding to the second reference image into an initial upscaling model, and obtaining the second model by training the initial upscaling model, based on the second test image and a second original image corresponding to the second image of the plurality of first original images.

The second model may be obtained through the operations of training the second model further including generating a plurality of second original images having a fifth resolution by capturing a second scene from a plurality of different viewpoints, generating a third image set having a sixth resolution lower than the fifth resolution, based on at least some of the plurality of second original images, generating a fourth image set having the sixth resolution and comprising images of the plurality of second original images different from images of the third image set, obtaining a second rendering model corresponding to the second scene by training an initial rendering model, based on the third image set, generating a fourth estimated image having the sixth resolution by inputting fourth position information of a fourth image of the fourth image set into the second rendering model, determining a fourth reference image for the fourth estimated image of images of the third image set, generating a fourth test image having the fifth resolution by inputting the fourth estimated image, the fourth reference image, the fourth position information, and fourth reference position information corresponding to the fourth reference image into the second model, and training the second model, based on the fourth test image and a fourth original image corresponding to the fourth image of the plurality of second original images.

In one or more general aspects, a non-transitory computer-readable storage medium may store instructions that, when executed by one or more processors, configure the one or more processors to perform any one, any combination, or all of operations and/or methods disclosed herein.

In one or more general aspects, an electronic device includes one or more processors configured to generate a first rendered image having a first resolution by inputting target position information for a target viewpoint into a first model for a target object comprised in a three-dimensional (3D) scene, determine one or more reference images of a plurality of first images for the first rendered image, wherein the plurality of first images is generated based on a plurality of original images by capturing the target object from a plurality of different viewpoints, each of the plurality of original images has a second resolution, and each of the plurality of first images has a first resolution lower than the second resolution, and generate a second rendered image having the second resolution by inputting the first rendered image, the reference image, the target position information, and reference position information for the reference image into a second model.

In one or more general aspects, a processor-implemented method includes obtaining a plurality of first original images having a resolution by capturing a first scene from a plurality of different viewpoints, generating a first image set having another resolution lower than the resolution, based on at least some of the plurality of first original images, generating a second image set having the other resolution comprising images of the plurality of first original images different from images of the first image set, obtaining a first rendering model corresponding to the first scene by training an initial rendering model, based on the first image set, generating a second estimated image having the other resolution by inputting second position information of a second image of the second image set into the first rendering model, determining at least one second reference image for the second estimated image from among images of the first image set, generating a second test image having the resolution by inputting the second estimated image, the second reference image, the second position information, second reference position information corresponding to the second reference image into an initial upscaling model, and obtaining the image upscaling model by training the initial upscaling model, based on the second test image and a second original image corresponding to the second image among the plurality of first original images.

The determining of the at least one second reference image for the second estimated image from among the images of the first image set may include obtaining a distance between each of the images of the first image set and the second estimated image, based on the second position information and position information corresponding to each of the images of the first image set, and determining the at least one second reference image based on the distance between each of the images of the first image set and the second estimated image.

The determining of the at least one second reference image based on the distance between each of the images of the first image set and the second estimated image may include determining an image having a distance from the second estimated image less than or equal to a preset reference value from among the images of the first image set.

The determining of the at least one second reference image based on the distance between each of the images of the first image set and the second estimated image may include determining a first update data set, a second update data set, and a third update data set corresponding to the second estimated image, the generating of the second test image by inputting the second estimated image, the second reference image, the second position information, and the second reference position information into the initial upscaling model may include generating the second test image respectively corresponding to the first update data set, the second update data set, and the third update data set, the training of the image upscaling model by training the initial upscaling model, based on the second test image and the second original image, may include obtaining the image upscaling model by training the initial upscaling model, based on the second original image and the second test images respectively corresponding to the first update data set, the second update data set, and the third update data set, the first update data set may include, as the second reference image, an image of the images of the first image set, wherein the image is closest to the second reference image, the second update data set may include, as the second reference image, an image of the images of the first image set, wherein the image has a distance from the second estimated image that is less than or equal to a preset reference value, and the third update data set may include, as the second reference image, an image randomly selected from among the images of the first image set.

The method may include obtaining a plurality of second original images having a fifth resolution by capturing a second scene from a plurality of different viewpoints, generating a third image set having a sixth resolution lower than the fifth resolution, based on at least some of the plurality of second original images, generating a fourth image set having the sixth resolution comprising images of the plurality of second original images different from images of the third image set, obtaining a second rendering model corresponding to the second scene by training an initial rendering model, based on the third image set, generating a fourth estimated image having the sixth resolution by inputting fourth position information of a fourth image of the fourth image set into the second rendering model, determining at least one fourth reference image for the fourth estimated image from among images of the third image set, generating a fourth test image having the fifth resolution by inputting the fourth estimated image, the fourth reference image, the fourth position information, and fourth reference position information corresponding to the fourth reference image into the image upscaling model, and training the image upscaling model, based on the fourth test image and a fourth original image corresponding to the fourth image of the plurality of second original images.

Other features and aspects will be apparent from the following detailed description, the drawings, and the claims.

Figure 1:
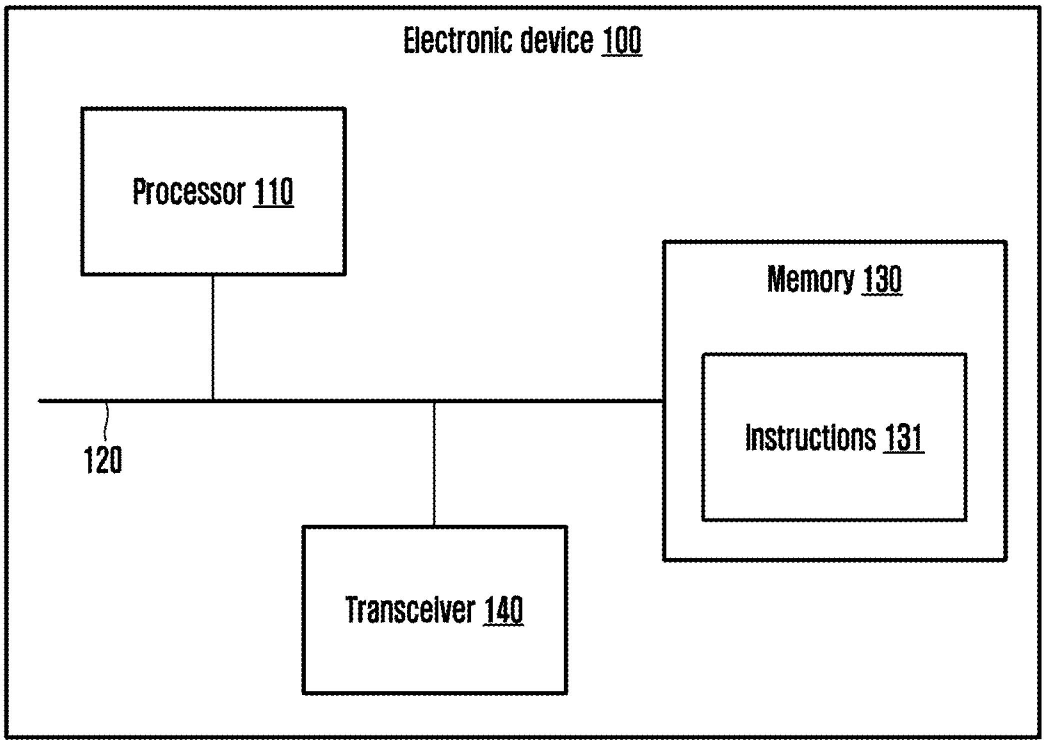
FIG. 1 illustrates an example of a configuration of an electronic device.

Throughout the drawings and the detailed description, unless otherwise described or provided, it may be understood that the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The terminology used herein is for describing various examples only and is not to be used to limit the disclosure. The articles “a,” “an,” and “the” are intended to include the plural forms as well, unless the context clearly indicates otherwise. As non-limiting examples, terms “comprise” or “comprises,” “include” or “includes,” and “have” or “has” specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms “comprise” or “comprises,” “include” or “includes,” and “have” or “has” specify the presence of stated features, numbers, operations, members, elements, and/or combinations thereof, other embodiments may exist where one or more of the stated features, numbers, operations, members, elements, and/or combinations thereof are not present.

Unless otherwise defined, all terms including technical and scientific terms used herein have the same meaning as commonly understood by one of ordinary skill in the art to which this disclosure pertains and based on an understanding of the disclosure of the present application. It will be further understood that terms, such as those defined in commonly-used dictionaries, should be interpreted as having a meaning that is consistent with their meaning in the context of the relevant art and the disclosure of the present application, and will not be interpreted in an idealized or overly formal sense unless expressly so defined herein.

When describing the examples with reference to the accompanying drawings, like reference numerals refer to like components and a repeated description related thereto will be omitted. In the description of example examples, detailed description of well-known related structures or functions will be omitted when it is deemed that such description will cause ambiguous interpretation of the present disclosure.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as "on," "connected to," "coupled to," or "joined to" another component, element, or layer, it may be directly (e.g., in contact with the other component, element, or layer) "on," "connected to," "coupled to," or "joined to" the other component element, or layer, or there may reasonably be one or more other components elements, or layers intervening therebetween. When a component or element is described as "directly on", "directly connected to," "directly coupled to," or "directly joined to" another component element, or layer, there can be no other components, elements, or layers intervening therebetween. Likewise, expressions, for example, "between" and "immediately between" and "adjacent to" and "immediately adjacent to" may also be construed as described in the foregoing.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment (e.g., as to what an example or embodiment may include or implement) means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment", and "one or more examples" has a same meaning as "in one or more embodiments").

The same name may be used to describe an element included in the examples described above and an element having a common function. Unless stated otherwise, the description of an example may be applicable to other examples, and a repeated description related thereto is omitted.

FIG. 1 illustrates an example of a configuration of an electronic device.

An electronic device 100 that performs a method of generating a rendered image for a three-dimensional (3D) scene including a target object may include a processor 110 (e.g., one or more processors), a bus 120, a memory 130 (e.g., one or more memories), and a transceiver 140.

The processor 110 may process data received by the transceiver 140 and data stored in the memory 130. A "processor" may be a hardware-implemented data processing device having a physically structured circuit to execute desired operations. The desired operations may include, for example, code or instructions included in a program. The hardware-implemented data processing device may include, for example, a microprocessor, a central processing unit (CPU), a processor core, a multi-core processor, a multiprocessor, an application-specific integrated circuit (ASIC), and a field programmable gate array (FPGA). For example, the processor 110 may be a combination of one or more microprocessors implementing a computing function or a combination of a digital signal processor (DSP) and a microprocessor.

The processor 110 may execute computer-readable code (e.g., instructions 131) stored in a memory (e.g., the memory 130) and instructions triggered by the processor 110.

The bus 120 may include a path for transferring information between components included in the electronic device 100. The bus 120 may be implemented as circuitry in the electronic device 100. The bus 120 may be a peripheral component interconnect (PCI) bus or an extended industry standard architecture (EISA) bus.

The bus 120 may include an address bus for transmitting an address of a memory and the like, a data bus for transmitting data, and a control bus for transmitting a control signal, depending on the type of information to be transmitted. The lines shown in FIG. 1 represent some of the buses (e.g., 120) for convenience of description, and the bus 120 is not limited to one or one type.

The memory 130 may store the data received by the transceiver 140 and the data processed by the processor 110. For example, the memory 130 may store the instructions 131 (or an application or software). For example, the memory 130 may be or include a non-transitory computer-readable storage medium storing the instructions 131 that, when executed by the processor 110, configure the processor 110 to perform any one, any combination, or all of operations and/or methods disclosed herein with reference to FIGS. 1-15. For example, the stored instructions 131 may be a set of syntaxes that are coded to be executable by the processor 110 so as to generate a rendered image for a 3D scene.

According to an aspect, the memory 130 may be read-only memory (ROM) or another type of static storage device for storing static information and instructions, random-access memory (RAM) or another type of dynamic storage device for storing information and instructions, electrically erasable programmable ROM (EEPROM), a compact disc read-only memory (CD-ROM) or other optical disc storages, an optical disc storage (including a compressive optical disc, a laser disc, an optical disc, a digital versatile disc (DVD), a Blu-ray disc, and the like), disk storage media, other magnetic storage devices, and/or other computer-readable medium that may be used to carry or store a computer program, but the type of the memory 130 is not limited thereto.

The memory 130 may store a computer program (e.g., the instructions 131) for executing examples and may be controlled by the processor 110. The processor 110 may implement the operations included in the methods described below by executing the computer program stored in the memory 130.

The electronic device 100 may optionally include the transceiver 140. The transceiver 140 may be connected to the processor 110 and the memory 130 via the bus 120 to transmit and receive data. The transceiver 140 may be connected to another external device to transmit and receive data to and from the external device. Hereinafter, transmitting and receiving "A" may refer to transmitting and receiving "information or data indicating A".

The number of processors (e.g., 110), memories (e.g., 130), and transceivers (e.g., 140) included in the electronic device 100 is not limited to one, and the structure of the electronic device 100 is not limited to the structure illustrated in FIG. 1.

Figure 2:
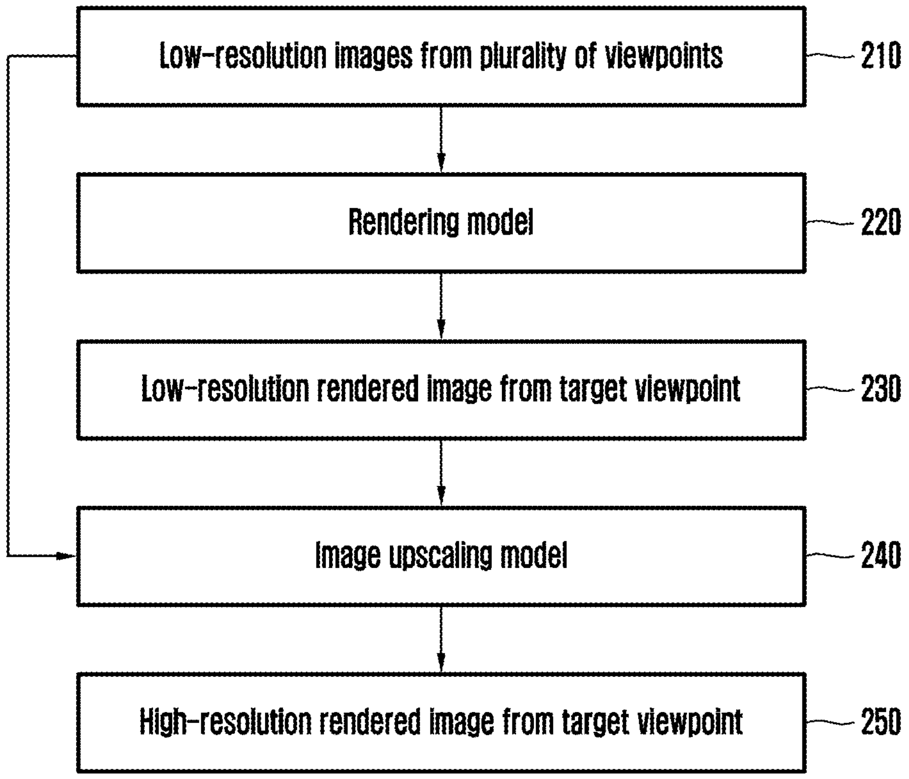
FIG. 2 illustrates an example of operations in which a high-resolution rendered image is generated.

FIG. 2 illustrates an example of operations in which a high-resolution rendered image is generated. Operations 210 to 250 to be described hereinafter may be performed sequentially in the order and manner as shown and described below with reference to FIG. 2, but the order of one or more of the operations may be changed, one or more of the operations may be omitted, and two or more of the operations may be performed in parallel or simultaneously without departing from the spirit and scope of the example embodiments described herein.

According to an example, operations in which a high-resolution rendered image is generated may include operation 210 of obtaining (e.g., generating) low-resolution images from a plurality of viewpoints, operation 220 of processing the low-resolution images of the plurality of viewpoints using a rendering model, operation 230 of obtaining a low-resolution rendered image of a target viewpoint, operation 240 of processing some of the plurality of low-resolution images from the plurality of viewpoints and the low-resolution rendered image of the target viewpoint using an image upscaling model, and operation 250 of obtaining the high-resolution rendered image of the target viewpoint.

In operation 210 of obtaining the low-resolution images from the plurality of viewpoints, an electronic device (e.g., the electronic device 100 of FIG. 1) may obtain a plurality of images for a 3D scene including a target object. For example, the low-resolution images from the plurality of viewpoints may be images obtained by capturing the target object from the plurality of viewpoints. For example, the low-resolution images from the plurality of viewpoints may be images obtained by down-sampling high-resolution original images obtained by capturing the target object from the plurality of viewpoints. For example, a low-resolution (e.g., 960×540) image may be obtained by down-sampling a high-resolution (e.g., 4K (3840×2160)) image obtained by capturing the target object from the plurality of viewpoints by a factor (e.g., a factor of 4).

In operation 220 of processing the low-resolution images from the plurality of viewpoints using the rendering model, the electronic device may obtain a rendering model for the 3D scene including the target object by updating an initial rendering model, based on the plurality of low-resolution images. "Updating" may be an operation of training or re-training a model including a neural network using a training data set such that the model may generate an output corresponding to a new input. For example, when the initial rendering model including the neural network is updated using a plurality of images for the 3D scene including the target object, a rendering model for the scene may be obtained, and the rendering model may receive position information for a new viewpoint and generate an image for a scene viewed from the new viewpoint.

The position information may be information about the position and angle of a camera corresponding to a predetermined viewpoint. For example, the position information may include an x-coordinate, a y-coordinate, and a z-coordinate representing the position of a camera in a 3D space and an azimuth angle $\theta$ and an elevation angle $\phi$ representing the direction in which the camera is facing. For example, the position information may be represented as a 4×4 matrix determined based on $(x, y, z, \theta, \phi)$. However, the position information is not limited to the example described above, and the position information may be set in various ways, such as including only the position of the camera or only the direction in which the camera is facing. For example, the position information may include coordinate information and rotation information. The coordinate information may be expressed as $(x, y, z)$, and the rotation information may be expressed as a tilt angle, a yaw angle, and a roll angle.

When a typical method and device updates the initial rendering model based on high-resolution images from a plurality of viewpoints, the neural network of the initial rendering model may require a lot of time to learn (e.g., to update) because the rendering model needs to output high-resolution images. In contrast, when a method and device of one or more embodiments updates the initial rendering model based on low-resolution images from a plurality of viewpoints, the time spent training the neural network of the initial rendering model may be shortened because the rendering model outputs low-resolution images.

According to an example, the rendering model may use a neural radiance fields (NeRF) model (or an algorithm). For example, the initial rendering model may be an instant neural graphics primitives (NGP) model. The NeRF model may model the distribution of color and luminance that may be observed when a 3D scene is viewed from a predetermined position using a neural network. The neural network of the NeRF model may learn about a 3D scene through images obtained by capturing the 3D scene from the plurality of viewpoints and the position information (3D coordinates and capturing angle of a camera) of the camera that captures each of the images and may receive position information about a new viewpoint and obtain a new image for the 3D scene observed from the viewpoint. For example, the neural network of the NeRF model may be a multilayer perceptron (MLP) that includes an input layer, a hidden layer (e.g., a plurality of hidden layers), and an output layer.

In operation 230 of obtaining the low-resolution rendering image from the target viewpoint, the electronic device may obtain a low-resolution rendering image from the target viewpoint by inputting position information for the target viewpoint into the rendering model for the 3D scene including the target object.

In operation 240 of processing some of the low-resolution images from the plurality of viewpoints and the low-resolution rendered image from the target viewpoint using the image upscaling model, the electronic device may determine at least one of the low-resolution images from the plurality of viewpoints as a reference image and perform upscaling of the low-resolution rendered image, based on the low-resolution rendered image, the reference image, position information of the low-resolution rendered image, and position information of the reference image. The image upscaling model may improve the resolution of the low-resolution rendered image from the target viewpoint by utilizing image details of a known viewpoint, based on the positional relationship between the known viewpoint and the target viewpoint.

According to an example, the image upscaling model may be a universal model that may be used regardless of the 3D scene represented by the low-resolution rendered image and the reference image. When the image upscaling model may be used regardless of the low-resolution rendering image, the image upscaling model may be pre-trained and the method and device of one or more embodiments may shorten the time required for generating a high-resolution rendered image because no additional learning corresponding to the target object is required.

According to an example, the image upscaling model may be used regardless of the type of rendering model.

According to an example, the image upscaling model may include a cascading residual network (CARN)-based neural network. For example, a super-resolution network included in the image upscaling model may include the CARN-based neural network. The CARN-based neural network model may include a plurality of residual blocks, and each of the plurality of residual blocks may sequentially form a residual connection. The CARN-based neural network model may perform an image upscaling task (i.e., an image super-resolution task) by efficiently using few computational resources through lightweight configuration.

According to an example, the image upscaling model may encode and fuse image information and position information of each of the reference image and the low-resolution rendered image and input the fused information into the super-resolution network. By inputting the fused information into the super-resolution network, an upscaling task based on the position information may be performed, and the method and device of one or more embodiments may improve the quality of the obtained super-resolution image.

In operation 250 of obtaining the high-resolution rendered image from the target viewpoint, the electronic device may obtain the high-resolution rendered image from the target viewpoint by upscaling the low-resolution rendered image from the target viewpoint using the image upscaling model. When the low-resolution rendered image from the target viewpoint is generated and the high-resolution rendered image is obtained by performing upscaling on the low-resolution rendered image, the method and device of one or more embodiments may shorten an execution time compared to a typical method and device in which the high-resolution image for the target viewpoint is directly rendered.

Figure 3:
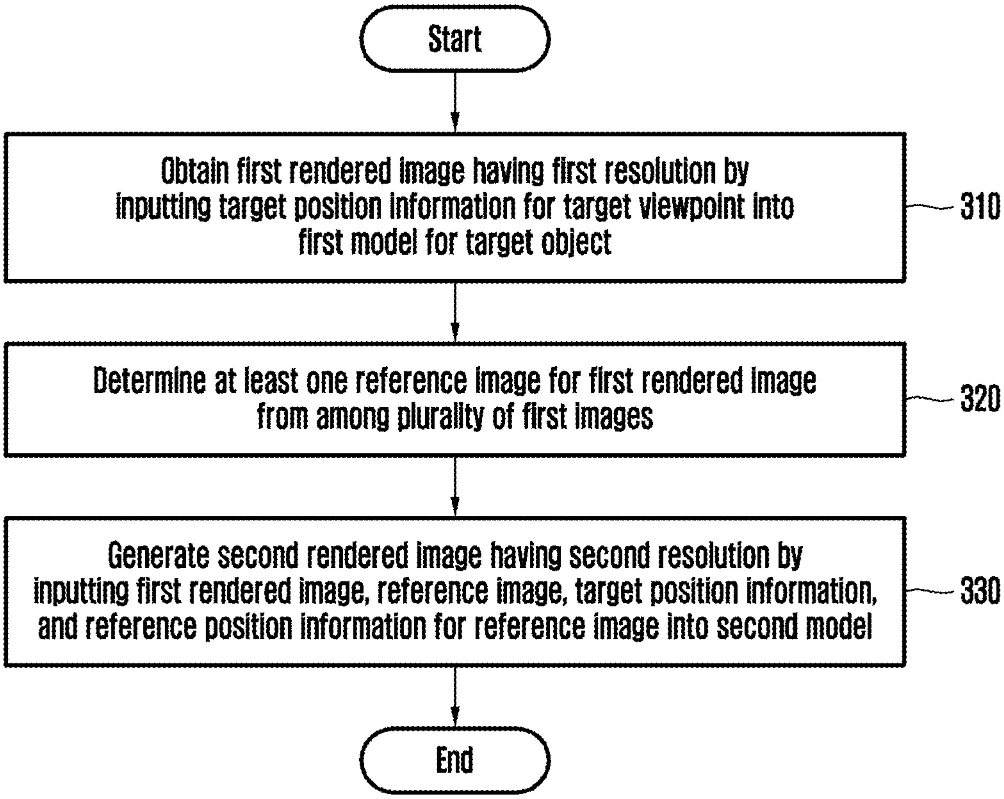
FIG. 3 illustrates an example of a method of generating a rendered image for a three-dimensional (3D) scene.

FIG. 3 illustrates an example of a method of generating a rendered image for a 3D scene. Operations 310 to 330 to be described hereinafter may be performed sequentially in the order and manner as shown and described below with reference to FIG. 3, but the order of one or more of the operations may be changed, one or more of the operations may be omitted, and two or more of the operations may be performed in parallel or simultaneously without departing from the spirit and scope of the example embodiments described herein.

Operations 310 to 330 may be performed by an electronic device (e.g., the electronic device 100 of FIG. 1). The electronic device may include a processor (e.g., the processor 110 of FIG. 1) and a memory (e.g., the memory 130 of FIG. 1).

In operation 310, the electronic device may obtain a first rendered image having a first resolution by inputting target position information for a target viewpoint into a first model for a target object. The target viewpoint may be a viewpoint in a 3D scene from which a user desires to obtain a rendered image. For example, the first model may obtain target position information corresponding to the target viewpoint as $(x, y, z, \theta, \phi)$ and generate a first rendered image for the 3D scene observed from the target viewpoint, based on the target position information.

According to an example, the electronic device may obtain the first model for the target object by updating an initial rendering model, based on a plurality of first images. The plurality of first images may be generated based on a plurality of original images obtained by capturing the target object from a plurality of different viewpoints. Each of the plurality of viewpoints of the plurality of first images may be a known viewpoint. For example, for each of the plurality of first images, position information of a first image may be used as an input of the initial rendering model, the first image corresponding to the input position information may be used as an actual output to train the initial rendering model, and a first model, which is a rendering model corresponding to the target object, may be obtained.

The resolution of the plurality of first images may be a first resolution, which is the same as the first rendered image, and the resolution of each of the plurality of original images may be a second resolution higher than the first resolution. The first rendered image may be generated by the first model obtained based on the plurality of first images, such that the first rendered image may have the same first resolution as the plurality of first images. By using low-resolution images to update the rendering model and enabling the rendering model to output a low-resolution rendered image, the method and device of one or more embodiments may shorten the time spent to obtain (or update) the first model for the target object.

According to an example, the plurality of first images may be generated by down-sampling each of the plurality of original images having the second resolution to have the first resolution. A plurality of first images corresponding to the plurality of original images may be obtained through down-sampling. For example, a plurality of first images with low resolution (e.g., 960×540) quality may be obtained by down-sampling each of a plurality of original images with high resolution (e.g., 4K (3840×2160)) quality by a factor (e.g., a factor of 4). For example, a plurality of first images may be obtained by performing Bicubic down-sampling on a plurality of original images. Herein, the multiples and methods of down-sampling are not limited to the examples described above.

According to an example, the initial rendering model may be an Instant-NGP model. However, the type of initial rendering model is not limited to the example described above, and various types of rendering models based on a neural network may be used.

In operation 320, the electronic device may determine at least one reference image for the first rendered image from among the plurality of first images.

According to an example, the electronic device may select at least one reference image, based on the distance between the plurality of first images and the first rendered image. An example of the method of selecting a reference image based on the distance between the plurality of first images and the first rendered image is described in detail below with reference to FIG. 4.

In operation 330, the electronic device may generate a second rendered image by inputting the first rendered image, the reference image, the target position information, and reference position information for the reference image into the second model. The second rendered image may have the same second resolution as the plurality of original images in which the target object is captured. When the first rendered image obtained through the first model is a low-resolution image, by performing detailed compensation on the first rendered image through the reference image according to the positional relationship between the reference image and the first rendered image, a super-resolution task on the first rendered image may be performed and a high-resolution second rendered image may be obtained. By using a first image from a known viewpoint to enhance the super-resolution effect of a low-resolution image from a new viewpoint, a second rendered image with a high resolution may be obtained.

According to an example, the second model, which is an image upscaling model, may include an image feature extraction network, a position information encoding network, and a super-resolution network. The operation of obtaining the second rendered image by inputting the first rendered image, the reference image, the target position information, and the reference position information for the reference image into the second model may include an operation of generating a first image feature for the first rendered image by inputting the first rendered image into the image feature extraction network, an operation of generating a reference image feature for the reference image by inputting the reference image into the image feature extraction network, an operation of generating a target position feature by inputting the target position information into the position information encoding network, an operation of generating a reference position feature by inputting the reference position information into the position information encoding network, and an operation of obtaining the second rendered image by inputting the first image feature, the reference image feature, the target position feature, and the reference position feature into the super-resolution network. An example of the method of obtaining the second rendered image, based on an image feature and a position feature of each of the reference image and the first rendered image is described in detail below with reference to FIGS. 5 to 8.

According to an example, the second model, which is an image upscaling model, may include a plurality of sequentially concatenated residual blocks. For example, the super-resolution network of the second model may include the plurality of residual blocks. The plurality of residual blocks may form residual connections, such that an input of each of the plurality of residual blocks may be generated based on at least one of outputs of previous residual blocks or an input of the super-resolution model. An example of the image upscaling model including the plurality of residual blocks is described in detail below with reference to FIGS. 9 to 11.

According to an example, the second model, which is an image upscaling model, may be updated based on a plurality of high-quality original images obtained by capturing a predetermined scene from a plurality of different viewpoints. The method of updating the second model may include an operation of obtaining a plurality of first original images having a third resolution obtained by capturing a first scene from a plurality of different viewpoints, an operation of generating a first image set having a fourth resolution lower than the third resolution, based on some of the plurality of first original images, an operation of generating a second image set having the fourth resolution including images of the plurality of first original images different from images of the first image set, an operation of obtaining the first rendering model corresponding to the first scene by updating the initial rendering model, based on the first image set, an operation of generating a second estimated image having the fourth resolution by inputting second position information of a second image of the second image set, an operation of determining at least one second reference image of the images of the first image set for the second estimated image, an operation of generating a second test image having the third resolution by inputting the second estimated image, the second reference image, the second position information, and the second reference position information corresponding to the second reference image into the initial upscaling model, and an operation of obtaining a second model by updating the initial upscaling model, based on the second test image and a second original image corresponding to the second image among the plurality of first original images. An example of the method of updating an image upscaling model is described in detail below with reference to FIGS. 12 to 14.

According to an example, the electronic device may obtain a high-resolution rendered image of a 3D scene including a target object from a target viewpoint through the second rendered image. The electronic device of one or more embodiments may obtain an image of the target object from a predetermined viewpoint, thereby enriching an image library for generating a display for the 3D scene and improving the accuracy of the display for the 3D scene. For example, the electronic device may use the display for the 3D scene including the target object in virtual reality (VR)/augmented reality (AR) technology.

Figure 4:
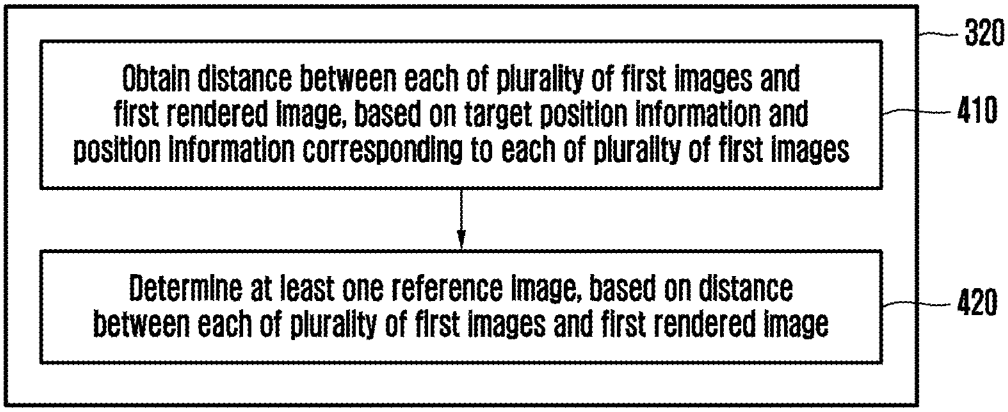
FIG. 4 illustrates an example of a method of determining a reference image, based on a distance between a plurality of low-resolution images and a low-resolution rendered image.

FIG. 4 illustrates an example of a method of determining a reference image, based on a distance between a plurality of low-resolution images and a low-resolution rendered image. Operations 410 to 440 to be described hereinafter may be performed sequentially in the order and manner as shown and described below with reference to FIG. 4, but the order of one or more of the operations may be changed, one or more of the operations may be omitted, and two or more of the operations may be performed in parallel or simultaneously without departing from the spirit and scope of the example embodiments described herein.

According to an example, operations 410 and 420 may be performed by an electronic device (e.g., the electronic device 100 of FIG. 1). The electronic device may include a processor (e.g., the processor 110 of FIG. 1) and a memory (e.g., the memory 130 of FIG. 1). For example, operation 320 described above with reference to FIG. 3 may include operations 410 and 420.

According to an example, the electronic device may select at least one reference image, based on the distance between the plurality of first images and the first rendered image.

In operation 410, the electronic device may obtain the distance between each of the plurality of first images and the first rendered image, based on the target position information and position information corresponding to each of the plurality of first images. For example, the distance between each of the first images and the first rendered image may be the Euclidean distance between the position information (e.g., a 4×4 matrix) of each of the first images and the target position information (e.g., a 4×4 matrix).

In operation 420, the electronic device may determine at least one reference image based on the distance between each of the plurality of first images and the first rendered image. For example, an image closest to (e.g., having a smallest distance from) the first rendered image may be selected as the reference image from among the plurality of first images. As another example, an image having a distance from the first rendered image less than or equal to a preset reference value may be selected as the reference image from among the plurality of first images. As another example, an image randomly selected from among all of the plurality of first images may be selected as the reference image.

According to another example, a plurality of images may be selected as reference images. For example, the electronic device may determine an image closest to the first rendered image as a first reference image from among the plurality of first images, determine an image having a distance from the first rendered image less than or equal to a preset reference value as a second reference image from among the plurality of first images, determine an image randomly selected from among the plurality of first images as a third reference image, and generate the second rendered image, based on the three reference images and the first rendered image. When a plurality of reference images is used, an upscaling task may be performed firmly on the first rendered image, and the quality of the first rendered image may be improved.

Figure 5:
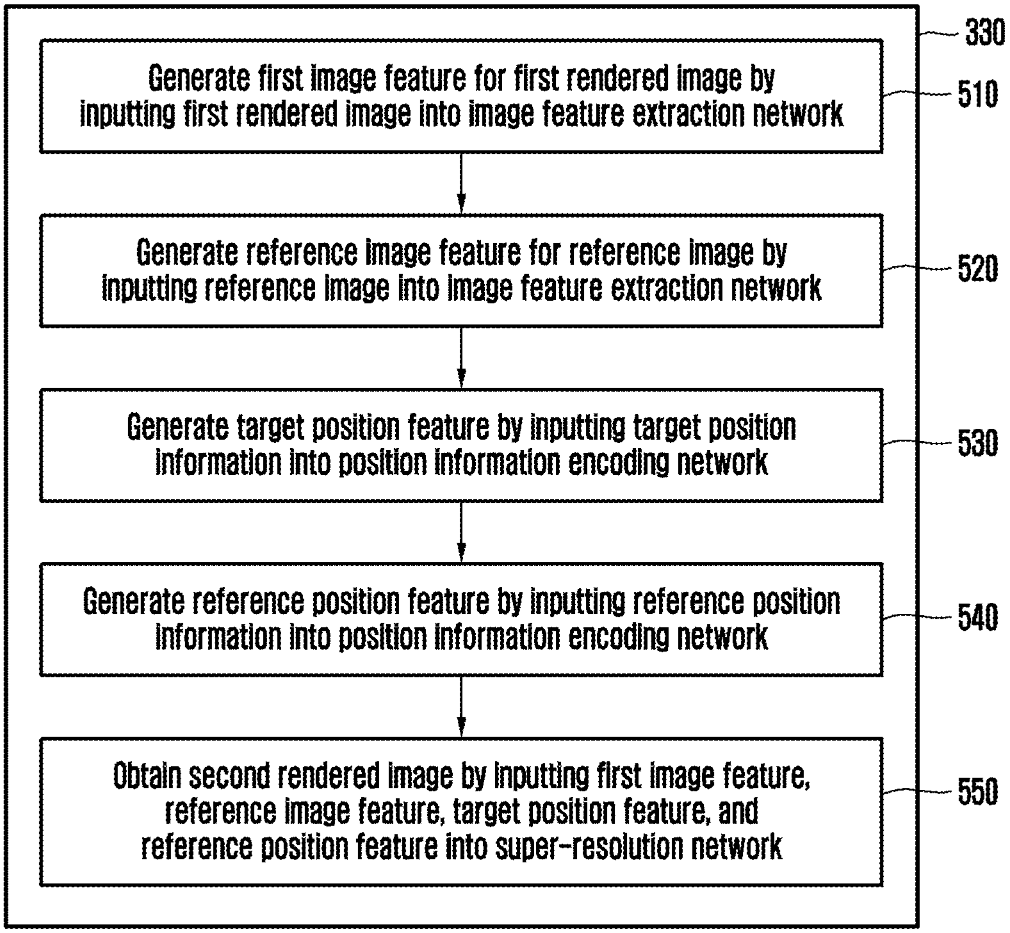
FIG. 5 illustrates an example of a method of obtaining a high-resolution rendered image, based on an image feature and a position feature of each of a low-resolution rendered image and a low-resolution reference image.
Figure 6:
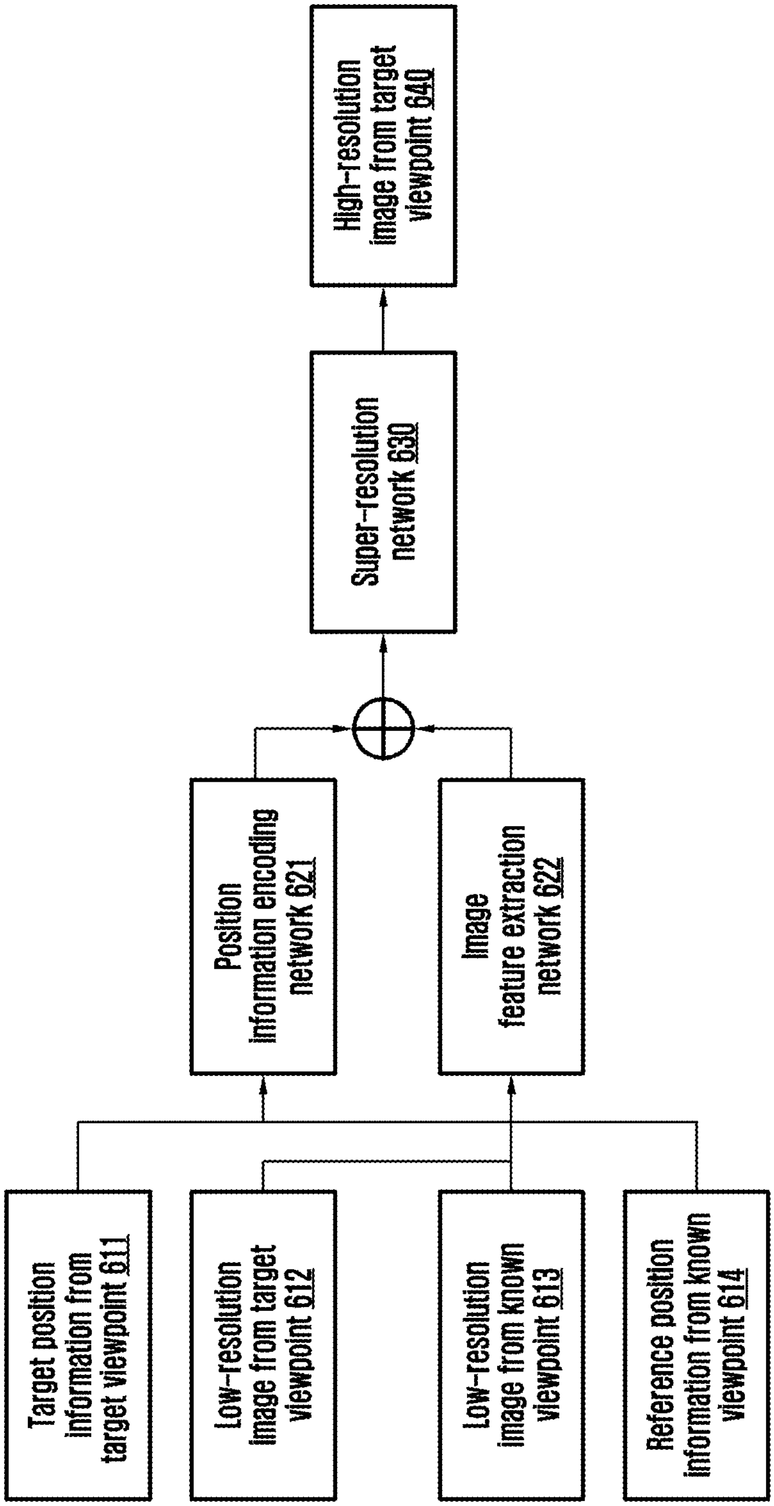
FIG. 6 illustrates an example of an image upscaling model.

FIG. 5 illustrates an example of a method of obtaining a high-resolution rendered image, based on an image feature and a position feature of each of a low-resolution rendered image and a low-resolution reference image. FIG. 6 illustrates an example of an image upscaling model. Operations 510 to 550 to be described hereinafter may be performed sequentially in the order and manner as shown and described below with reference to FIG. 5, but the order of one or more of the operations may be changed, one or more of the operations may be omitted, and two or more of the operations may be performed in parallel or simultaneously without departing from the spirit and scope of the example embodiments described herein.

Operations 510 to 550 may be performed by an electronic device (e.g., the electronic device 100 of FIG. 1). The electronic device may include a processor (e.g., the processor 110 of FIG. 1) and a memory (e.g., the memory 130 of FIG. 1). For example, operation 330 described above with reference to FIG. 3 may include operations 510 to 550.

According to an example, a second model, which is an image upscaling model, may include an image feature extraction network, a position information encoding network, and a super-resolution network.

In operation 510, the electronic device may generate a first image feature for the first rendered image by inputting a first rendered image into an image feature extraction network. An image feature may be higher-dimensional information obtained by processing an image. For example, an image feature extraction network may be a single convolutional layer of size 3×1, but the form of the image feature extraction network is not limited to the example described above.

In operation 520, the electronic device may generate a reference image feature for a reference image by inputting the reference image into an image feature extraction network.

In operation 530, the electronic device may generate a target position feature by inputting target position information into a position information encoding network. The position feature may be higher-dimensional information obtained by processing position information. The position feature may be obtained by encoding position information.

According to an example, the electronic device may obtain the position feature by encoding 3D position coordinates of position information. An example of the method of obtaining a position feature based on 3D position coordinates is described in detail below with reference to FIG. 7.

In operation 540, the electronic device may generate a reference position feature by inputting reference position information into the position information encoding network.

In operation 550, the electronic device may obtain a second rendered image by inputting the first image feature, the reference image feature, the target position feature, and the reference position feature into the super-resolution network. The super-resolution network may obtain, as a target position feature and a reference position feature, a positional relationship between a viewpoint of the first rendered image and a viewpoint of the reference image, obtain, as the first image feature and the reference image feature, detailed information of the first rendered image and the reference image, and upscale the first rendered image based on the obtained information, thereby generating the second rendered image.

Referring to FIG. 6, an image upscaling model (e.g., a second model) may obtain target position information 611 of a target viewpoint, a low-resolution image 612 (e.g., the first rendered image) from the target viewpoint, a low-resolution image 613 (e.g., the reference image) from a known viewpoint, and reference position information 614 from the known viewpoint and generate a high-resolution image 640 (e.g., the second rendered image) from the target viewpoint, based on the obtained information. The image upscaling model may include a position information encoding network 621, an image feature extraction network 622, and a super-resolution network 630. The image feature extraction network 630 may output a first image feature and a reference image feature, based on the obtained low-resolution image 612 from the target viewpoint and the low-resolution image 613 from the known viewpoint. The position information encoding network 621 may output a target position feature and a reference position feature, based on the obtained target position information 611 and the reference position information 614. The super-resolution network 630 may generate the high-resolution image 640 from the target viewpoint, based on the first image feature, the reference image feature, the target position feature, and the reference position feature. For example, the image upscaling model may obtain a first fusion feature by fusing the first image feature and the target position feature and obtain a reference fusion feature by fusing the reference image feature and the reference position feature. The super-resolution network 630 may output the high-resolution image 640 from the target viewpoint, based on the obtained first fusion feature and the reference fusion feature.

According to an example, the image upscaling model may be a universal model that may be used regardless of the 3D scene represented by the low-resolution rendered image and the reference image. When the image upscaling model may be used regardless of the low-resolution rendering image, the image upscaling model may be pre-trained and thus the method and device of one or more embodiments may shorten the time taken for generating a high-resolution rendered image because no additional learning corresponding to the target object is required.

Figure 7:
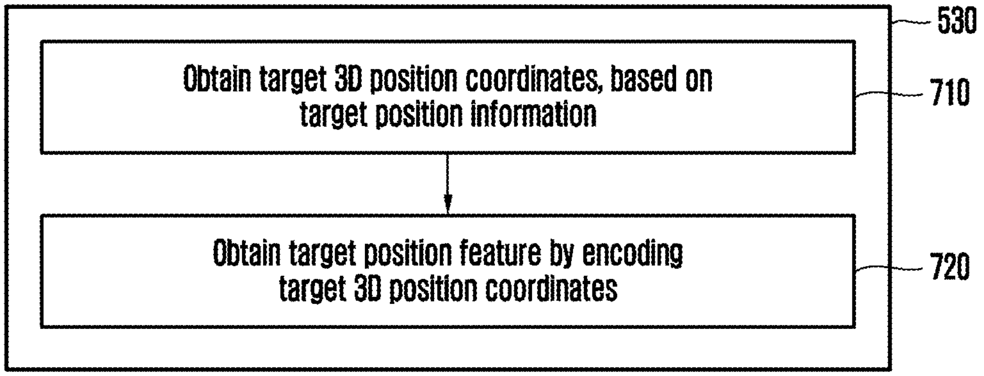
FIG. 7 illustrates an example of a method of obtaining a position feature of an image.

FIG. 7 illustrates an example of a method of obtaining a position feature of an image. Operations 710 to 720 to be described hereinafter may be performed sequentially in the order and manner as shown and described below with reference to FIG. 7, but the order of one or more of the operations may be changed, one or more of the operations may be omitted, and two or more of the operations may be performed in parallel or simultaneously without departing from the spirit and scope of the example embodiments described herein.

According to an example, operations 710 and 720 may be performed by an electronic device (e.g., the electronic device 100 of FIG. 1). The electronic device may include a processor (e.g., the processor 110 of FIG. 1) and a memory (e.g., the memory 130 of FIG. 1). For example, operation 530 described above with reference to FIG. 5 may include operations 710 and 720.

According to an example, the electronic device may obtain the position feature by encoding 3D position coordinates of position information.

In operation 710, the electronic device may obtain target 3D position coordinates, based on target position information. The 3D position coordinates may be spatial coordinates of a point where a camera is positioned corresponding to a predetermined viewpoint from which a rendered image is desired to be obtained. For example, when the position information is represented as a 4×4 matrix, the values in the last column of the first three rows of the 4×4 matrix may be extracted as the x-coordinate, y-coordinate, and z-coordinate, respectively.

In operation 720, the electronic device may obtain a target position feature by encoding the target 3D position coordinates. Through the process of extracting and encoding the 3D position coordinates, a position feature used for performing a super-resolution task on the low-resolution rendered image may be obtained.

According to an example, the position information encoding network may obtain a position code by normalizing 3D position coordinates (x, y, z) to the interval {−1, 1} and then encoding the 3D position coordinates using an encoding function. For example, an encoding function such as Equation 1 below may be used.

$$\gamma(p)=(\sin(2^0\pi p),\cos(2^0\pi p),\ \ldots\ ,\sin(2^{L-1}\pi p),\cos(2^{L-1}\pi p)) \quad \text{Equation 1:}$$

In Equation 1, L is a frequency level at which the normalized 3D position coordinates are encoded. For example, when L is 10, the length of the result of encoding the 3D position coordinates may be 3×2×10+3=63. In the above example, 3 may correspond to each of the 3D position coordinates (x, y, z), 2 may correspond to each of the sin and cos determinations, and 10 may correspond to L. Since the length of the encoding result corresponds to the input dimension of an image, the dimension of the position code is 63×h×w, where h and w may denote the height and width of the input image, respectively. The position information encoding network may obtain a position feature by inputting the position code into a 1×1 sized convolution block.

Operations 710 and 720 may be similarly modified for operation 540 of generating a reference position feature. The electronic device may obtain reference 3D position coordinates based on reference position information and obtain a reference position feature by encoding the reference 3D position coordinates.

Figure 8:
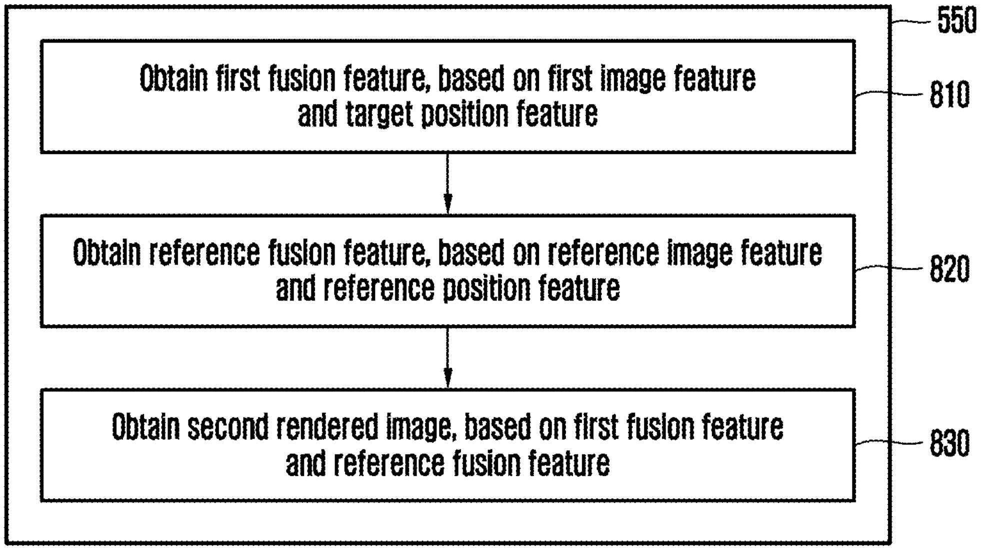
FIG. 8 illustrates an example of a method of obtaining a high-resolution rendered image based on a fusion feature of each of a low-resolution rendered image and a low-resolution reference image.

FIG. 8 illustrates an example of a method of obtaining a high-resolution rendered image based on a fusion feature of each of a low-resolution rendered image and a low-resolution reference image. Operations 810 to 830 to be described hereinafter may be performed sequentially in the order and manner as shown and described below with reference to FIG. 8, but the order of one or more of the operations may be changed, one or more of the operations may be omitted, and two or more of the operations may be performed in parallel or simultaneously without departing from the spirit and scope of the example embodiments described herein.

According to an example, operations 810 to 830 may be performed by an electronic device (e.g., the electronic device 100 of FIG. 1). The electronic device may include a processor (e.g., the processor 110 of FIG. 1) and a memory (e.g., the memory 130 of FIG. 1). For example, operation 550 described above with reference to FIG. 5 may include operations 810 to 830.

In operation 810, the electronic device may obtain a first fusion feature, based on a first image feature and a target position feature. For example, an image upscaling model (e.g., a second model) may generate the first fusion feature by merging the first image feature and the target position feature for a first rendered image and performing a 1×1 convolution operation.

In operation 820, the electronic device may obtain a reference fusion feature, based on a reference image feature and a reference position feature. For example, the image upscaling model may generate the reference fusion feature by merging the reference image feature and the reference position feature for a reference image and performing the 1×1 convolution operation.

In operation 830, the electronic device may obtain a second rendered image, based on the first fusion feature and the reference fusion feature. When the image feature and the position feature of each of the first rendered image and the reference image are fused and then input into a super-resolution network, the image feature and the position feature of the first rendered image or the reference image may be simultaneously reflected in the process of generating the second rendered image.

Figure 9:
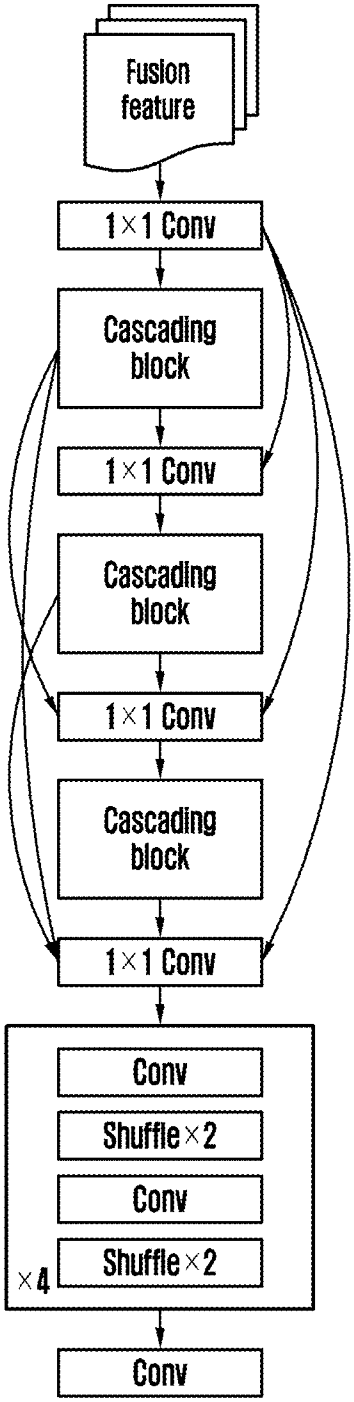
FIG. 9 illustrates an example of a super-resolution network.
Figure 10:
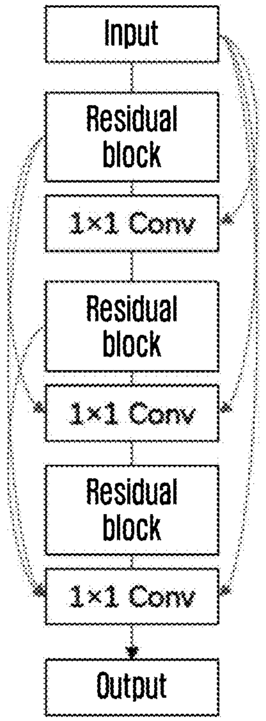
FIG. 10 illustrates an example of cascading blocks.
Figure 11:
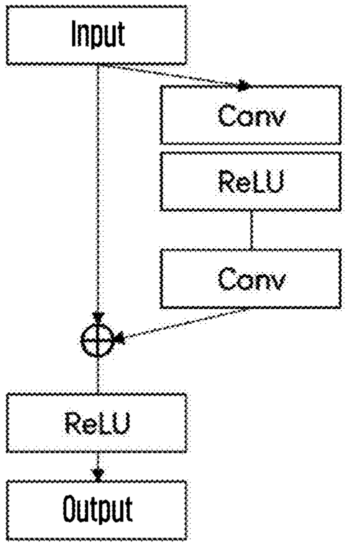
FIG. 11 illustrates an example of residual blocks.

FIG. 9 illustrates an example of a super-resolution network, FIG. 10 illustrates an example of cascading blocks, and FIG. 11 illustrates an example of residual blocks.

An image upscaling model (e.g., a second model) may include a CARN-based super-resolution network. The CARN-based super-resolution network may include a plurality of sequentially concatenated residual blocks. Each of the plurality of residual blocks may form residual connections, such that an input of each of the plurality of residual blocks may be generated based on at least one of outputs of previous residual blocks or an input of the second model. A residual connection may be a connection in a neural network including a plurality of layers that merges outputs of previous layers and an input of the neural network to generate an input of the next layer. Outputs of various levels may be reflected through residual connections, such that the method and device of one or more embodiments may train the neural network quickly, and may perform training stably in the neural network with many layers.

The CARN-based super-resolution network may include a plurality of sequentially concatenated cascading blocks, and each of the plurality of cascading blocks may include a plurality of residual blocks that may form residual connections. Each of the plurality of cascading blocks may form a residual connection, such that an input of each of the plurality of cascading blocks may be generated based on at least one of outputs of previous cascading blocks and/or an input of the second model.

As illustrated in FIG. 9, a super-resolution network may include three cascading blocks. An output of each of the plurality of cascading blocks may be fused with an input of the super-resolution network and outputs of the previous cascading blocks through a 1×1 convolution block such that an input of the next cascading block may be generated. As an output of the last cascading block among the three cascading blocks is input into an upscaling block, a high-resolution second rendered image may be generated.

As illustrated in FIG. 10, each of the cascading blocks may include three residual blocks. An output of each of a plurality of residual blocks may be fused with an input of a cascading block and an output of previous residual blocks through a 1×1 convolution block such that an input of a next residual block may be generated.

As illustrated in FIG. 11, each residual block may include two convolution operations, two rectified linear unit (ReLU) activation functions, and one residual addition. A first feature map for the input of the residual block may be generated through a first convolution operation, a transformed first feature map for a first feature map may be generated through a first ReLU function, and a second feature map for the transformed first feature map may be generated through a second convolution operation. An output of the residual block may be generated by adding the second feature map and the input through residual addition and transforming the result of adding the second feature map and the input of the residual block through the second ReLU function.

Figure 12:
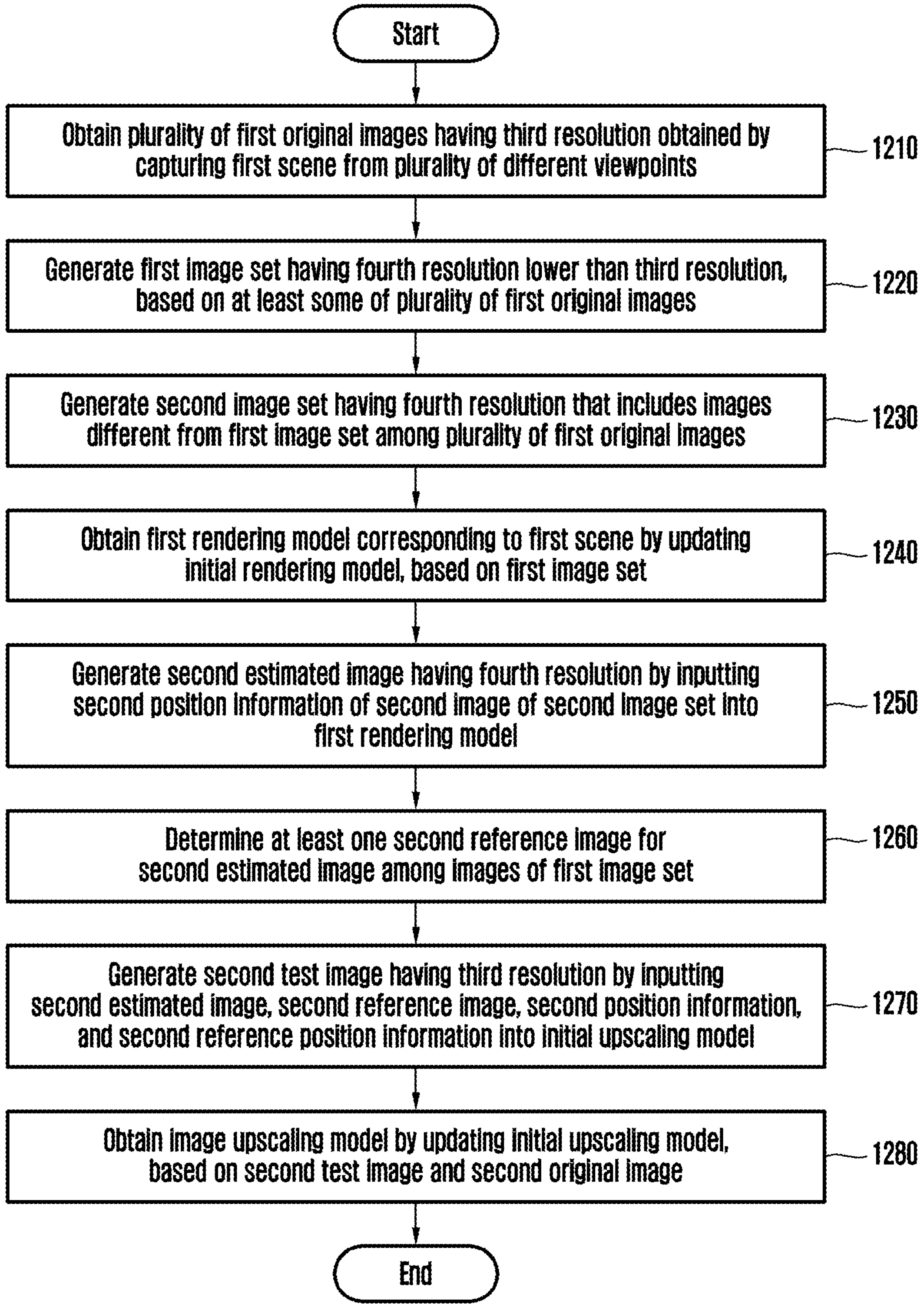
FIG. 12 illustrates an example of a method of updating an image upscaling model.
Figure 13:
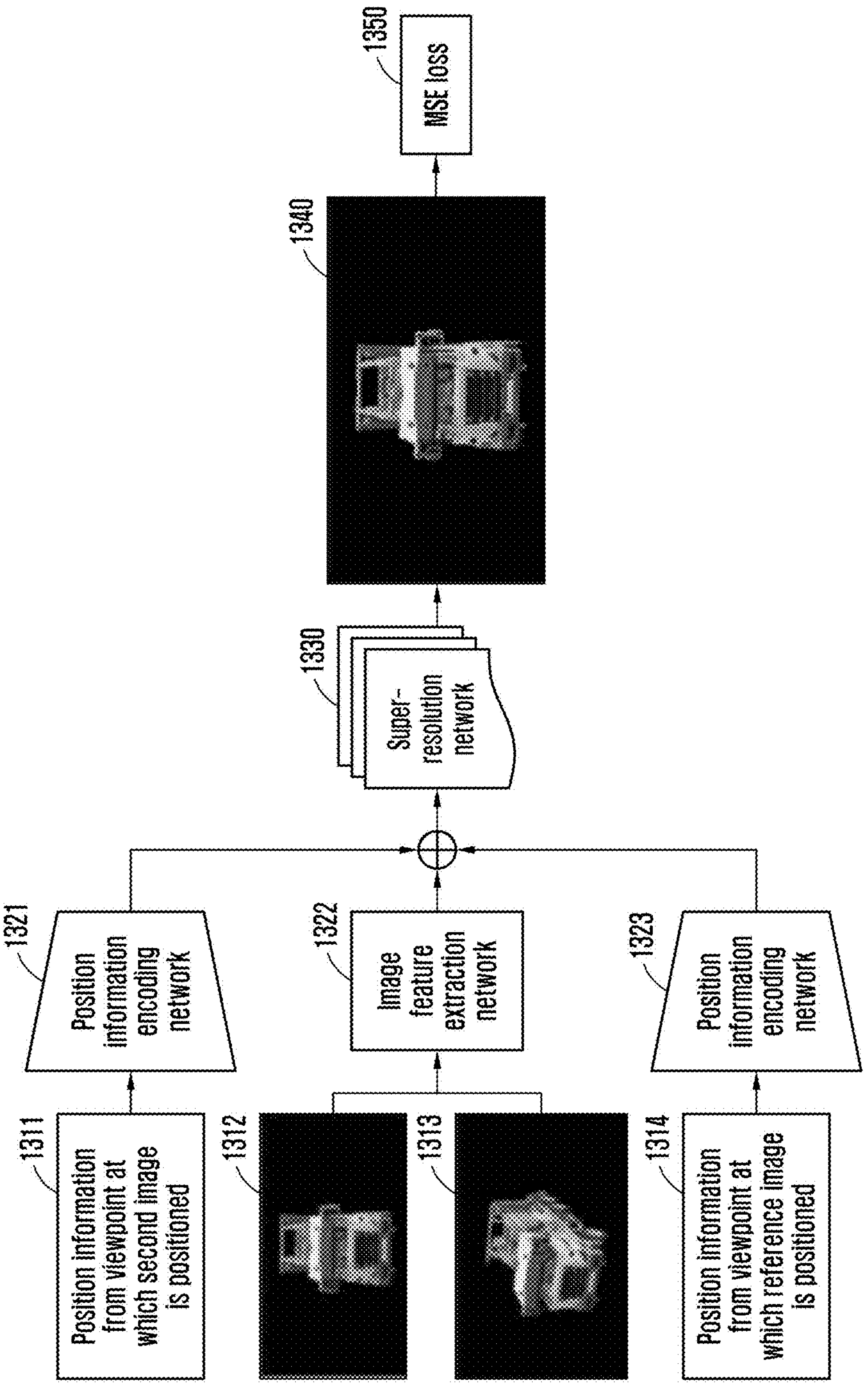
FIG. 13 illustrates an example of a method of updating an image upscaling model.

FIG. 12 illustrates an example of a method of updating an image upscaling model. FIG. 13 illustrates an example of a method of updating an image upscaling model. Operations 1210 to 1280 to be described hereinafter may be performed sequentially in the order and manner as shown and described below with reference to FIG. 12, but the order of one or more of the operations may be changed, one or more of the operations may be omitted, and two or more of the operations may be performed in parallel or simultaneously without departing from the spirit and scope of the example embodiments described herein.

Operations 1210 to 1280 may be performed by an electronic device (e.g., the electronic device 100 of FIG. 1). The electronic device may include a processor (e.g., the processor 110 of FIG. 1) and a memory (e.g., the memory 130 of FIG. 1).

In operation 1210, the electronic device may obtain a plurality of first original images having a third resolution (e.g., the second resolution) obtained by capturing a first scene from a plurality of different viewpoints. The plurality of first original images may have a high resolution (i.e., third resolution). For example, the plurality of first original images may be obtained through Blender software, a free open source 3D graphics image software. For example, the electronic device may obtain the plurality of first original images by receiving 200 4K images obtained by capturing a predetermined scene from a plurality of different viewpoints via Blender software. Position information corresponding to each of the plurality of first original images may be obtained together with the plurality of first original images in a 4×4 matrix.

In operation 1220, the electronic device may generate a first image set having a fourth resolution (e.g., the first resolution) lower than the third resolution, based on at least some of the plurality of first original images. The first image set may have a low resolution (e.g., the fourth resolution). For example, the plurality of first original images may be 200 high-resolution 4K images, and a low-resolution first image set may be generated by down-sampling 100 images of the plurality of first original images by a factor of 4.

In operation 1230, the electronic device may generate a second image set having the fourth resolution that includes images different from the first image set among the plurality of first original images. The second image set may be generated in the same way as the first image set and may have a low resolution (e.g., the fourth resolution). For example, a low-resolution second image set may be generated by down-sampling 100 images from the plurality of first original images that are not included in the first image set by a factor of 4.

In operation 1240, the electronic device may obtain a first rendering model corresponding to a first scene by updating an initial rendering model, based on the first image set. The initial rendering model may be updated, based on low-resolution images included in the first image set and the location information corresponding to each of the low-resolution images. For example, the initial rendering model may be an Instant-NGP model. When the images that the initial rendering model learns are low-resolution images, the method and device of one or more embodiments may quickly train the initial rendering model.

In operation 1250, the electronic device may generate a second estimated image having the fourth resolution by inputting second position information of a second image of the second image set into the first rendering model. The second estimated image may be an image estimated by the first rendering model for the same viewpoint as the second image. Since the first rendering model is trained by the plurality of first images, the second estimated image obtained by the first rendering model may have the same low resolution (i.e., the fourth resolution) as the plurality of first images. The description of operation 310 provided with reference to FIG. 3 may be similarly modified and applied.

In operation 1260, the electronic device may determine at least one second reference image for the second estimated image among the images of the first image set. The description of operation 320 provided with reference to FIG. 3 may be similarly modified and applied.

According to an example, operation 1260 may include an operation of obtaining the distance between each of the images of the first image set and the second estimated image, based on second position information and position information corresponding to each of the images of the first image set and an operation of determining at least one second reference image based on the distance between each of the images of the first image set and the second estimated image. For example, the distance between each of the images of the first image set and the second estimated image may be the Euclidean distance between position information (4×4 matrix) of each of the images of the first image set and the second position information (4×4 matrix). For example, an image closest to the second estimated image may be selected as the second reference image from among the images of the first image set. For example, an image having a distance from the second estimated image less than or equal to a preset reference value may be selected as the second reference image from among the images of the first image set. For example, an image randomly selected from the entire set of images in the first image set may be selected as the second reference image.

According to an example, a plurality of images may be selected as second reference images. For example, the electronic device may determine, as the second reference image, an image closest to the second estimated image from among the images of the first image set, determine, as the second reference image, an image having a distance to the second estimated image less than or equal to a preset reference value from among the images of the first image set, determine, as the second reference image, an image randomly selected from the entire set of images in the first image set, and generate a second test image, based on the three reference images and the first rendered image. For example, the top 10 images among the images of the first image set that are closest to the second estimated image may be determined as second reference images. When a plurality of reference images is used, the method and device of one or more embodiments may accurately perform an upscaling task on the second estimated image, thereby improving the quality of the second test image.

According to an example, the electronic device may form a plurality of data sets corresponding to one second estimated image and update an image upscaling model for each data set. For example, the electronic device may determine a first update data set, a second update data set, and a third update data set corresponding to the second estimated image. For example, the first update data set may include, as a second reference image, an image closest to the second estimated image from among the images of the first image set, the second update data set may include, as a second reference image, an image having a distance to the second estimated image less than or equal to a preset reference value from among the images of the first image set, and the third update data set may include, as a second reference image, an image randomly selected from among the images of the first image set. The electronic device may obtain an image upscaling model by generating second test images respectively corresponding to the first update data set, the second update data set, and the third update data set and updating an initial upscaling model, based on a second original image and the second test images respectively corresponding to the first update data set, the second update data set, and the third update data set. For example, the electronic device may determine 10 update data sets corresponding to the top 10 images closest to the second estimated image from among the images of the first image set. When training data for the image upscaling model is configured through reference images selected by different criteria, the method and device of one or more embodiments may obtain an accurate image upscaling model for the viewpoint difference between the second estimated image and the reference image.

In operation 1270, the electronic device may generate the second test image having the third resolution by inputting the second estimated image, the second reference image, the second position information, and the second reference position information into the initial upscaling model. The second reference position information may be position information corresponding to the second reference image. The description of operation 330 provided with reference to FIG. 3 may be similarly modified and applied.

According to an example, the image upscaling model may include an image feature extraction network, a position information encoding network, and a super-resolution network. The image upscaling model may obtain an image feature and a position feature of each of the second estimated image and the second reference image, obtain a second estimated fusion feature by merging the image feature and the position feature of the second estimated image, and obtain a second reference fusion feature by fusing the image feature and the position feature of the second reference image. For example, the image upscaling model may generate a fusion feature by merging an image feature and a position feature of the second estimated image or the second reference image and performing a 1×1 convolution operation. The image upscaling model may generate the second test image by inputting the second estimated fusion feature and the second reference fusion feature into a super-resolution network. According to an example, the image feature and the position feature of each of the second estimated image and the second reference image are fused and then input into the super-resolution network, such that the image feature and the position feature of the second estimated image or the second reference image may be simultaneously reflected in the process of generating the second test image.

In operation 1280, the electronic device may obtain an image upscaling model by updating the initial upscaling model, based on the second test image and the second original image. The second original image may be an image corresponding to a second image among the plurality of first original images. The image upscaling model may be obtained by adjusting a parameter of the initial upscaling model or the image upscaling model, based on the loss between the second test image and the second original image. For example, as illustrated in FIG. 13, the loss between the second test image and the second original image may be determined as a mean square error (MSE) loss 1350, but the loss between the second test image and the second original image may be determined through various loss functions, such as an L1 loss function.

When the first image set and the second image set are generated based on first original images obtained by capturing the same scene from a plurality of different viewpoints, the method and device of one or more embodiments may update the image upscaling model with accurate training data, and thus may improve the training effect of the image upscaling model.

According to an example, the method of updating an image upscaling model may be performed on a plurality of scenes. An example of a method of updating an image upscaling model for a second scene is described in detail below with reference to FIG. 14.

Referring to FIG. 13, the electronic device may obtain a second estimated image 1312, a reference image 1313, position information 1311 from a viewpoint at which the second image is positioned, and position information 1314 from a viewpoint at which the reference image is positioned, based on images obtained by capturing a target object from a plurality of different viewpoints. The image upscaling model may include a position information encoding network 1321, 1323, an image feature extraction network 1322, and a super-resolution network 1330. The image feature extraction network 1322 may receive a second estimated image 1312 and a reference image 1313 and output a second estimated image feature and a second reference image feature. The position information encoding network 1321, 1323 may receive position information 1311 of the viewpoint at which the second image is positioned and position information 1314 of the viewpoint at which the reference image is positioned, and generate a second estimated position feature and a second reference position feature. The super-resolution network 1330 may generate a second test image 1340, based on the second estimated image feature, the second reference image feature, the second estimated position feature, and the second reference position feature. For example, the image upscaling model may obtain a second estimated fusion feature by fusing the second estimated image feature and the second estimated position feature and may obtain a second reference fusion feature by fusing the second reference image feature and the second reference position feature. The super-resolution network 1330 may output the second test image 1340 by receiving the second estimated fusion feature and the second reference fusion feature. The electronic device may update the image upscaling model by determining a loss 1350 between the second test image 1340 and the second original image and adjusting a parameter of the image upscaling model, based on the loss 1350.

Figure 14:
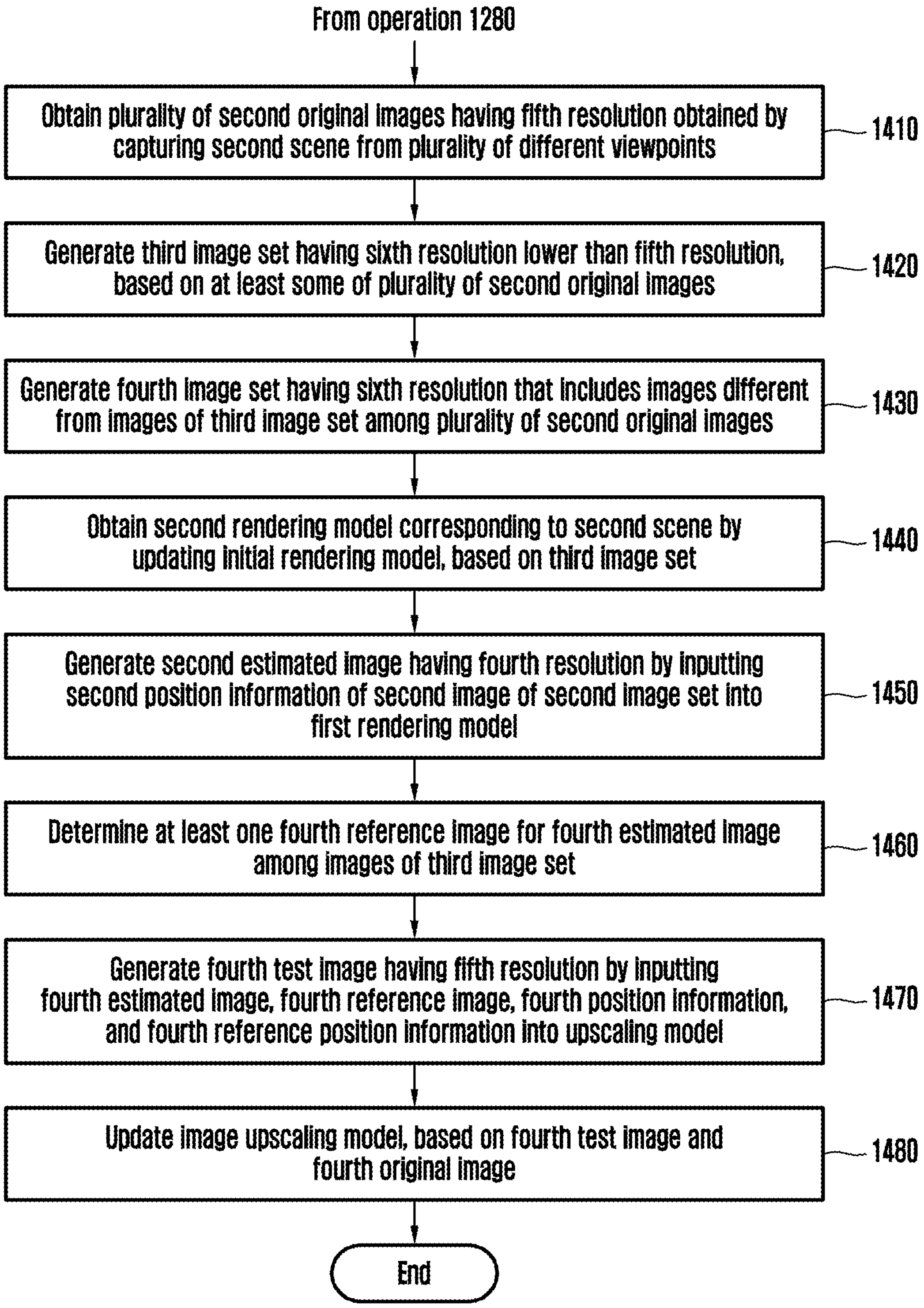
FIG. 14 illustrates an example of a method of updating an image upscaling model using original images for a plurality of scenes.

FIG. 14 illustrates an example of a method of updating an image upscaling model using original images for a plurality of scenes. Operations 1410 to 1480 to be described hereinafter may be performed sequentially in the order and manner as shown and described below with reference to FIG. 8, but the order of one or more of the operations may be changed, one or more of the operations may be omitted, and two or more of the operations may be performed in parallel or simultaneously without departing from the spirit and scope of the example embodiments described herein.

Operations 1410 to 1480 may be performed by an electronic device (e.g., the electronic device 100 of FIG. 1). The electronic device may include a processor (e.g., the processor 110 of FIG. 1) and a memory (e.g., the memory 130 of FIG. 1). For example, operations 1410 to 1480 may be performed after operation 1280 described above with reference to FIG. 12 is performed.

According to an example, the method of updating an image upscaling model may be performed on a plurality of scenes. For example, the electronic device may obtain training data for 16 scenes, and each piece of training data may include 300 original images and position information corresponding to each of the original images. The electronic device may use the original images for 13 of the 16 scenes to update the image upscaling model and may use the original images for 3 of the 16 scenes to test the image upscaling model.

In operation 1410, the electronic device may obtain a plurality of second original images having a fifth resolution obtained by capturing a second scene from a plurality of different viewpoints. The plurality of second original images may have a high resolution (i.e., fifth resolution). For example, the fifth resolution may be different from the third resolution, which is the resolution of the plurality of first original images for the first scene.

In operation 1420, the electronic device may generate a third image set having a sixth resolution lower than the fifth resolution, based on at least some of the plurality of second original images. The third image set may have a low resolution (i.e., sixth resolution). For example, the sixth resolution may be different from the fourth resolution, which is the resolution of the first image set and the second image set for the first scene.

In operation 1430, the electronic device may generate a fourth image set having the sixth resolution that includes images different from the images of the third image set among the plurality of second original images. The fourth image set may be generated in the same way as the third image set and may have a low resolution (i.e., sixth resolution).

In operation 1440, the electronic device may obtain a second rendering model corresponding to a second scene by updating an initial rendering model, based on the third image set.

In operation 1450, the electronic device may generate a fourth estimated image having the sixth resolution by inputting fourth position information of a fourth image of the fourth image set into the second rendering model.

In operation 1460, the electronic device may determine at least one fourth reference image for the fourth estimated image among the images of the third image set.

In operation 1470, the electronic device may generate the fourth test image having the fifth resolution by inputting the fourth estimated image, the fourth reference image, the fourth position information, and the fourth reference position information into the initial upscaling model. The fourth reference position information may be position information corresponding to the fourth reference image.

In operation 1480, the electronic device may update the image upscaling model, based on the fourth test image and a fourth original image. The fourth original image may be an image corresponding to the fourth image among the plurality of second original images.

The description of each of operations 1210 to 1280 described above with reference to FIG. 12 may be similarly modified and applied to each of operations 1410 to 1480.

When the image upscaling model is updated based on a plurality of original images related to a plurality of different scenes, a universal image upscaling model that may be used regardless of a 3D scene represented by a low-resolution rendered image and a reference image may be obtained. When the image upscaling model is used regardless of the 3D scene, the image upscaling model may be pre-trained, and no additional learning corresponding to the target object is required, such that the method and device of one or more embodiments may shorten the time taken for generating a high-resolution rendered image.

Figure 15:
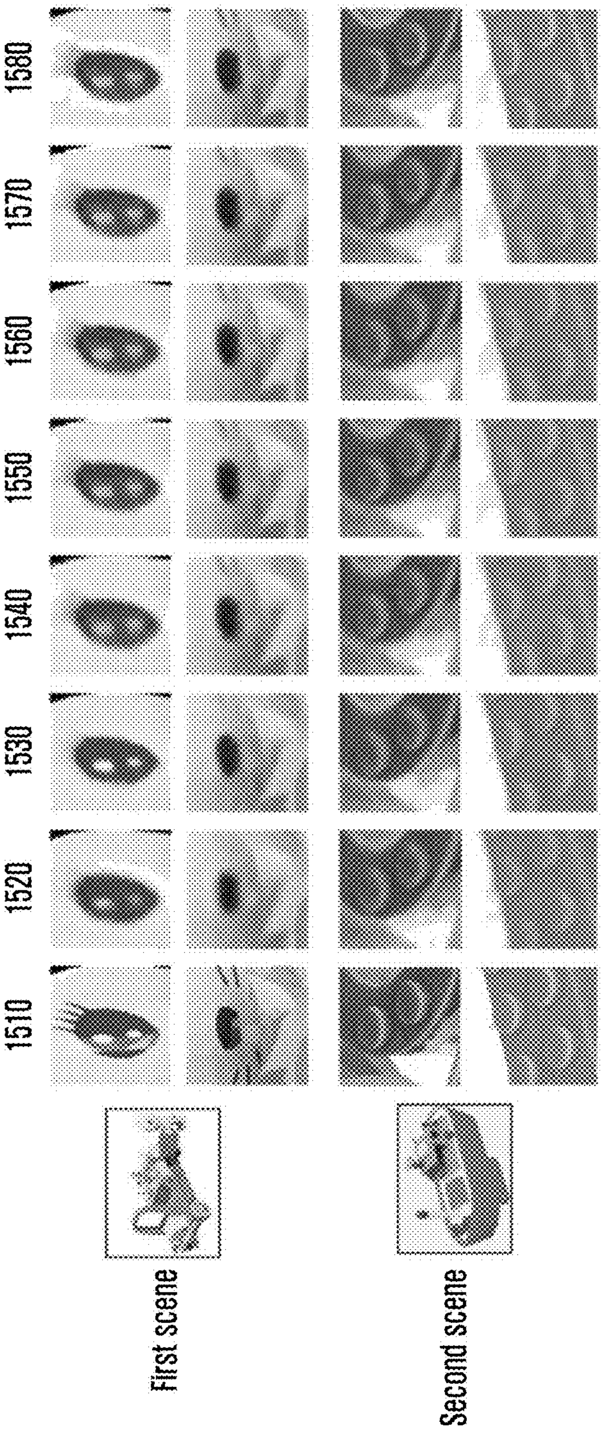
FIG. 15 illustrates an example of a rendering effect according to a technique for generating rendered images for various 3D scenes.

FIG. 15 illustrates an example of a rendering effect according to a technique for generating rendered images for various 3D scenes.

FIG. 15 illustrates the results of generating rendered images for each of techniques for generating original images for partial regions of a first scene and a second scene and rendered images for a plurality of 3D scenes. For each of the techniques for generating the original image and the rendered images for the plurality of 3D scenes, images corresponding to a first region and a second region, which are portions of the first scene, and images corresponding to a third region and a fourth region, which are portions of the second scene, are sequentially displayed.

A first column 1510 shows the original images for regions 1 to 4. A second column 1520 shows the results of training an Instant-NGP model using a plurality of high-resolution original images for 10 seconds and directly generating a high-resolution rendered image. A third column 1530 shows the results of training the Instant-NGP model using a plurality of high-resolution original images for 20 seconds and directly generating a high-resolution rendered image. A fourth column 1540 shows the results of training the Instant-NGP model using the plurality of low-resolution original images for 10 seconds and generating a high-resolution rendered image using the Bicubic technique based on the low-resolution rendered image. A fifth column 1550 shows the results of training the Instant-NGP model using the plurality of low-resolution original images for 10 seconds and generating a high-resolution rendered image using the Liif technique based on the low-resolution rendered image. A sixth column 1560 shows the results of training the Instant-NGP model using the plurality of low-resolution original images for 10 seconds and generating a high-resolution rendered image using the SwinIR technique based on the low-resolution rendered image. A seventh column 1570 shows the results of training the Instant-NGP model using the plurality of low-resolution original images for 10 seconds and generating a high-resolution rendered image using the CARN technique based on the low-resolution rendered image. An eight column 1580 shows the results of training the Instant-NGP model using the plurality of low-resolution original images for 10 seconds and generating a high-resolution rendered image using the technique according to an example of the present disclosure, based on the low-resolution rendered image.

Comparing the original images in the first column 1510 to the generated rendered image results, artifacts appear in the generated rendered image results in the second to seventh columns 1520 to 1570, and some details are relatively blurry. Referring to the generated rendered image results shown in the eighth column 1580, a clearer and more accurate high-quality rendered image may be obtained through the method according to an example of the present disclosure.

The electronic device may include a first image generator, a reference image determiner, and a second image generator. The first image generator may generate a low-resolution rendered image by inputting target position information corresponding to a target viewpoint into a rendering model corresponding to a target object. The reference image determiner may determine a reference image of a low-resolution rendered image from among a plurality of low-resolution images used to update a rendering model corresponding to the target object. For example, the plurality of low-resolution images used to update the rendering model may be obtained based on the plurality of high-resolution original images obtained by capturing the target object from different viewpoints. The second image generator may generate a high-resolution rendered image, based on the low-resolution rendered image, the reference image, the target position information, and the reference position information corresponding to the reference image. The high-resolution rendered image may have the same resolution as the plurality of original images obtained by capturing the target object from different viewpoints.

According to an example, the reference image determiner may determine a reference image of the low-resolution rendered image, based on the distance between the plurality of low-resolution images used to update the rendering model and the low-resolution rendered image. For example, an image having a distance from a low-resolution rendered image less than or equal to a reference value may be determined as the reference image from among the plurality of low-resolution images.

The second image generator may obtain a high-resolution rendered image by compensating for the low-resolution rendered image using the reference image, based on position information of each of the low-resolution rendered image and the reference image.

According to an example, the second image generator may obtain an image feature and a position feature of each of the low-resolution rendered image and the reference image and obtain the high-resolution rendered image by inputting the image feature and the position feature of each of the low-resolution rendered image and the reference image into the high-resolution network.

According to an example, the second image generator may obtain 3D position coordinates from position information (target position information) of the low-resolution rendered image and 3D position coordinates from position information (reference position information) of the reference image and may obtain position features of the low-resolution rendered image and the reference image by encoding the 3D position coordinates.

According to an example, the second image generator may generate a fusion feature of the low-resolution rendered image by fusing the image feature and position feature of the low-resolution rendered image, generate a fusion feature of the reference image by fusing the image feature and the position feature of the reference image, and generate the high-resolution rendered image by inputting the fusion feature of the low-resolution rendered image and the fusion feature of the reference image.

According to an example, the super-resolution network included in the second image generator may include a plurality of sequentially concatenated residual blocks, and each of the plurality of residual blocks may form residual connections.

According to an example, the electronic device may further include an updater. The updater may update the super-resolution network of the second image generator through a method of updating an image upscaling model, the method including an operation of obtaining the plurality of first original images having the third resolution obtained by capturing the first scene from the plurality of different viewpoints, an operation of generating the first image set having the fourth resolution lower than the third resolution, based on at least some of the plurality of first original images, an operation of generating the second image set having the fourth resolution including images of the plurality of first original images different from images of the first image set, an operation of obtaining the first rendering model corresponding to the first scene by updating the initial rendering model, based on the first image set, an operation of generating the second estimated image having the fourth resolution by inputting the second position information of the second image of the second image set into the first rendering model, an operation of determining at least one second reference image for the second estimated image from among the images of the first image set, an operation of generating the second test image having the third resolution by inputting the second estimated image, the second reference image, the second position information, and the second reference position information corresponding to the second reference image into the initial upscaling model, and an operation of obtaining the second model by updating the initial upscaling model, based on the second test image and the second original image corresponding to the second image among the plurality of first original images.

According to an example, the updater may form a plurality of data sets corresponding to one second estimated image and update an image upscaling model for each data set. For example, the operation of determining at least one second reference image based on the distance between each of the images of the first image set and the second reference image may include an operation of determining a first update data set, a second update data set, and a third data set corresponding to the second estimated image. For example, the first update data set may determine, as a second reference image, an image closest to the second estimated image from among the images of the first image set, the second update data set may determine, as a second reference image, an image having a distance to the second estimated image less than or equal to a preset reference value from among the images of the first image set, and the third update data set may determine, as a second reference image, an image randomly selected from among the images of the first image set. The operation of generating the second test image by inputting the second estimated image, the second reference image, the second position information, and the second reference position information into the initial upscaling model may include an operation of generating second test images respectively corresponding to the first update data set, the second update data set, and the third update data set, and the operation of obtaining the image upscaling model by updating the initial upscaling model, based on the second test image and the second original image, may include an operation of obtaining the image upscaling model by updating the initial upscaling model, based on the second original image and the second test images respectively corresponding to the first update data set, the second update data set, and the third update data set.

The electronic device may further include a third obtainer. The third obtainer may obtain a plurality of original images obtained by capturing a 3D scene including a target object from different viewpoints and obtain a plurality of low-resolution images used to update a rendering model corresponding to the target object by down-sampling the plurality of original images.

According to an example, the second image generator may obtain a display for the 3D scene including the target object by obtaining high-resolution rendered images from a plurality of different viewpoints.

Each of the first image generator, the reference image determiner, the second image generator, the updater, and the third obtainer may be a hardware component or hardware implementing instructions respectively corresponding to roles in software.

The electronic devices, processors, buses, memories, transceivers, electronic device 100, processor 110, bus 120, memory 130, and transceiver 140 described herein, including descriptions with respect to respect to FIGS. 1-15, are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in, and discussed with respect to, FIGS. 1-15 that perform the operations described in this application are performed by computing hardware, for example, by one or more processors or computers, implemented as described above implementing instructions (e.g., computer or processor/processing device readable instructions) or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method comprising:

generating a first rendered image having a first resolution by inputting target position information for a target viewpoint into a first model for a target object comprised in a three-dimensional (3D) scene;

determining one or more reference images for the first rendered image from among a plurality of first images, wherein the plurality of first images is generated based on a plurality of original images in which the target object is captured from a plurality of different viewpoints, each of the plurality of original images has a second resolution, and each of the plurality of first images has the first resolution lower than the second resolution; and generating a second rendered image having the second resolution by inputting the first rendered image, the reference image, the target position information, and reference position information for the reference image into a second model.

2. The method of claim 1, further comprising obtaining the first model for the target object by training an initial rendering model, based on the plurality of first images.

3. The method of claim 1, wherein the determining of the one or more reference images for the first rendered image from among the plurality of first images comprises:

determining a distance between each of the plurality of first images and the first rendered image, based on the target position information and position information corresponding to each of the plurality of first images; and determining the one or more reference images based on the distance between each of the plurality of first images and the first rendered image.

4. The method of claim 3, wherein the determining of the one or more reference images based on the distance between each of the plurality of first images and the first rendered image comprises determining, as the reference image, an image having a distance from the first rendered image less than or equal to a preset reference value from among the plurality of first images.

5. The method of claim 1, wherein the determining of the one or more reference images for the first rendered image from among the plurality of first images comprises determining, as the one or more reference images, an image randomly selected from among the plurality of first images.

6. The method of claim 1, wherein the second model comprises an image feature extraction network, a position information encoding network, and a super-resolution network, and the generating of the second rendered image by inputting the first rendered image, the reference image, the target position information, and the reference position information for the reference image into the second model comprises:

generating a first image feature for the first rendered image by inputting the first rendered image into the image feature extraction network;

generating a reference image feature for the reference image by inputting the reference image into the image feature extraction network;

generating a target position feature by inputting the target position information into the position information encoding network;

generating a reference position feature by inputting the reference position information into the position information encoding network; and generating the second rendered image by inputting the first image feature, the reference image feature, the target position feature, and the reference position feature into the super-resolution network.

7. The method of claim 6, wherein the generating of the target position feature by inputting the target position information into the position information encoding network comprises:

determining target 3D position coordinates based on the target position information; and determining the target position feature by encoding the target 3D position coordinates.

8. The method of claim 6, wherein the generating of the second rendered image by inputting the first image feature, the reference image feature, the target position feature, and the reference position feature into the super-resolution network comprises:

determining a first fusion feature, based on the first image feature and the target position feature;

determining a reference fusion feature, based on the reference image feature and the reference position feature; and generating the second rendered image, based on the first fusion feature and the reference fusion feature.

9. The method of claim 1, wherein the second model comprises a plurality of sequentially concatenated residual blocks, and an input of each of the plurality of sequentially concatenated residual blocks is generated based on one or more of outputs of previous residual blocks or an input of the second model.

10. The method of claim 9, wherein the second model sequentially comprises a plurality of cascading blocks, wherein each of the plurality of cascading blocks comprises a plurality of residual blocks, and an input of each of the plurality of cascading blocks is generated based on one or more of outputs of previous cascading blocks or the input of the second model.

11. The method of claim 1, wherein the plurality of first images is generated by down-sampling each of the plurality of original images having the second resolution to have the first resolution.

12. The method of claim 1, wherein the second model is obtained through operations of training the second model comprising:

generating a plurality of first original images having a third resolution by capturing a first scene from a plurality of different viewpoints;

generating a first image set having a fourth resolution lower than the third resolution, based on at least some of the plurality of first original images;

generating a second image set having the fourth resolution comprising images of the plurality of first original images different from images of the first image set;

obtaining a first rendering model corresponding to the first scene by training an initial rendering model, based on the first image set;

generating a second estimated image having the fourth resolution by inputting second position information of a second image of the second image set into the first rendering model;

determining one or more second reference images for the second estimated image from among images of the first image set;

generating a second test image having the third resolution by inputting the second estimated image, the second reference image, the second position information, second reference position information corresponding to the second reference image into an initial upscaling model; and obtaining the second model by training the initial upscaling model, based on the second test image and a second original image corresponding to the second image of the plurality of first original images.

13. The method of claim 12, wherein the second model is obtained through the operations of training the second model further comprising:

generating a plurality of second original images having a fifth resolution by capturing a second scene from a plurality of different viewpoints;

generating a third image set having a sixth resolution lower than the fifth resolution, based on at least some of the plurality of second original images;

generating a fourth image set having the sixth resolution and comprising images of the plurality of second original images different from images of the third image set;

obtaining a second rendering model corresponding to the second scene by training an initial rendering model, based on the third image set;

generating a fourth estimated image having the sixth resolution by inputting fourth position information of a fourth image of the fourth image set into the second rendering model;

determining a fourth reference image for the fourth estimated image of images of the third image set;

generating a fourth test image having the fifth resolution by inputting the fourth estimated image, the fourth reference image, the fourth position information, and fourth reference position information corresponding to the fourth reference image into the second model; and training the second model, based on the fourth test image and a fourth original image corresponding to the fourth image of the plurality of second original images.

14. A non-transitory computer-readable storage medium storing instructions that, when executed by one or more processors, configure the one or more processors to perform the method of claim 1.

15. An electronic device comprising:

one or more processors configured to:

generate a first rendered image having a first resolution by inputting target position information for a target viewpoint into a first model for a target object comprised in a three-dimensional (3D) scene;

determine one or more reference images of a plurality of first images for the first rendered image, wherein the plurality of first images is generated based on a plurality of original images by capturing the target object from a plurality of different viewpoints, each of the plurality of original images has a second resolution, and each of the plurality of first images has a first resolution lower than the second resolution; and generate a second rendered image having the second resolution by inputting the first rendered image, the reference image, the target position information, and reference position information for the reference image into a second model.

16. A processor-implemented method comprising:

obtaining a plurality of first original images having a resolution by capturing a first scene from a plurality of different viewpoints;

generating a first image set having another resolution lower than the resolution, based on at least some of the plurality of first original images;

generating a second image set having the other resolution comprising images of the plurality of first original images different from images of the first image set;

obtaining a first rendering model corresponding to the first scene by training an initial rendering model, based on the first image set;

generating a second estimated image having the other resolution by inputting second position information of a second image of the second image set into the first rendering model;

determining at least one second reference image for the second estimated image from among images of the first image set;

generating a second test image having the resolution by inputting the second estimated image, the second reference image, the second position information, second reference position information corresponding to the second reference image into an initial upscaling model; and obtaining the image upscaling model by training the initial upscaling model, based on the second test image and a second original image corresponding to the second image among the plurality of first original images.

17. The method of claim 16, wherein the determining of the at least one second reference image for the second estimated image from among the images of the first image set comprises:

obtaining a distance between each of the images of the first image set and the second estimated image, based on the second position information and position information corresponding to each of the images of the first image set; and determining the at least one second reference image based on the distance between each of the images of the first image set and the second estimated image.

18. The method of claim 17, wherein the determining of the at least one second reference image based on the distance between each of the images of the first image set and the second estimated image comprises determining an image having a distance from the second estimated image less than or equal to a preset reference value from among the images of the first image set.

19. The method of claim 17, wherein the determining of the at least one second reference image based on the distance between each of the images of the first image set and the second estimated image comprises determining a first update data set, a second update data set, and a third update data set corresponding to the second estimated image, the generating of the second test image by inputting the second estimated image, the second reference image, the second position information, and the second reference position information into the initial upscaling model comprises generating the second test image respectively corresponding to the first update data set, the second update data set, and the third update data set, the training of the image upscaling model by training the initial upscaling model, based on the second test image and the second original image, comprises obtaining the image upscaling model by training the initial upscaling model, based on the second original image and the second test images respectively corresponding to the first update data set, the second update data set, and the third update data set, the first update data set comprises, as the second reference image, an image of the images of the first image set, wherein the image is closest to the second reference image, the second update data set comprises, as the second reference image, an image of the images of the first image set, wherein the image has a distance from the second estimated image that is less than or equal to a preset reference value, and the third update data set comprises, as the second reference image, an image randomly selected from among the images of the first image set.

20. The method of claim 16, further comprising:

obtaining a plurality of second original images having a fifth resolution by capturing a second scene from a plurality of different viewpoints;

generating a third image set having a sixth resolution lower than the fifth resolution, based on at least some of the plurality of second original images;

generating a fourth image set having the sixth resolution comprising images of the plurality of second original images different from images of the third image set;

obtaining a second rendering model corresponding to the second scene by training an initial rendering model, based on the third image set;

generating a fourth estimated image having the sixth resolution by inputting fourth position information of a fourth image of the fourth image set into the second rendering model;

determining at least one fourth reference image for the fourth estimated image from among images of the third image set;

generating a fourth test image having the fifth resolution by inputting the fourth estimated image, the fourth reference image, the fourth position information, and fourth reference position information corresponding to the fourth reference image into the image upscaling model; and training the image upscaling model, based on the fourth test image and a fourth original image corresponding to the fourth image of the plurality of second original images.

* * * * *